US012679480B2

(12) United States Patent
    Miles

(10) Patent No.:    US 12,679,480 B2
(45) Date of Patent:        Jul. 14, 2026

(54) WHEEL CARRIER

(71) Applicant: Shane Robert Miles, Arundel (AU)

(72) Inventor: Shane Robert Miles, Arundel (AU)

( * ) Notice: Subject to any disclaimer, the term of this patent is extended or adjusted under 35 U.S.C. 154(b) by 85 days.

(21) Appl. No.: 18/281,505

(22) PCT Filed: May 11, 2021

(86) PCT No.: PCT/AU2021/050434
     § 371 (c)(1),
     (2) Date: Sep. 11, 2023

(87) PCT Pub. No.: WO2022/187884
     PCT Pub. Date: Sep. 15, 2022

(65)          Prior Publication Data
     US 2024/0149959 A1      May 9, 2024

(30)      Foreign Application Priority Data

Mar. 10, 2021    (AU) ................................ 2021900683
     Apr. 29, 2021    (AU) ................................ 2021901262

(51) Int. Cl.
     *B62D 43/02*        (2006.01)
     *B60R 19/48*        (2006.01)
(52) U.S. Cl.
     CPC .............. *B62D 43/02* (2013.01); *B60R 19/48* (2013.01)
(58) Field of Classification Search
     CPC ................................ B60R 43/02; B62D 43/02
     See application file for complete search history.

(56)          References Cited

U.S. PATENT DOCUMENTS 1,849,855 A      3/1932  Stutsman et al.
3,019,928 A  *   2/1962  Mullins ................... B62D 43/02
                                                  224/403
3,490,727 A  *   1/1970  Miller .................... A62C 15/00
                                                  211/101
3,717,271 A  *   2/1973  Bargman ............... B62D 43/02
                                                  414/463
4,274,795 A  *   6/1981  Taylor ................. B66F 9/07559
                                                  414/673

(Continued)

FOREIGN PATENT DOCUMENTS

CN          111516766 A  *  8/2020  ............. B62D 43/02
FR            2728861 A1 *  7/1996  ........... B62D 43/002

(Continued)

OTHER PUBLICATIONS

International Search Report and Written Opinion for Application No. PCT/AU2021/050434 dated Sep. 28, 2021.

*Primary Examiner* — Scott T McNurlen
(74) *Attorney, Agent, or Firm* — Amster, Rothstein & Ebenstein LLP

(57)          ABSTRACT
A wheel carrier for a vehicle, including a first component adapted to be secured on or to a vehicle a second component operatively connected to said first component for movement relative thereto from a stowed or upper position to an extended or lowered position and a third component operatively connected to said second component for movement relative thereto from a stowed or upper position to an extended or lowered position, said third component including means for mounting a spare wheel thereto and securing means for securing said third component in the stowed or upper position.

16 Claims, 24 Drawing Sheets

(56)          References Cited

U.S. PATENT DOCUMENTS

| | | | | |
|---|---|---|---|---|
| 5,183,192 | A | 2/1993 | Mrozowski et al. | |
| 5,456,564 | A * | 10/1995 | Bianchini | B60R 9/06 |
| | | | | 224/508 |
| 6,918,520 | B2 * | 7/2005 | Skinner | B62D 43/02 |
| | | | | 224/42.21 |
| 9,096,160 | B2 * | 8/2015 | Le Anna | B60R 9/06 |
| 2002/0040917 | A1 * | 4/2002 | Newbill | B60R 9/06 |
| | | | | 224/512 |
| 2019/0100258 | A1 | 4/2019 | Cherry et al. | |
| 2020/0148289 | A1 * | 5/2020 | Evans | B62D 43/02 |

FOREIGN PATENT DOCUMENTS

| | | |
|---|---|---|
| JP | H0586769 U | 11/1993 |
| JP | H09156542 A | 6/1997 |
| JP | 2005349877 A | 12/2005 |
| JP | 2006036163 A | 2/2006 |
| WO | 2000030917 A1 | 6/2000 |

* cited by examiner

118

WHEEL CARRIER

The invention has particular application to a wheel carrier for mounting a wheel to a vehicle. More specifically the invention relates to a wheel carrier for mounting a spare wheel (sometimes referred to as a spare tyre) to the outside of the vehicle.

Many four wheel drive vehicles (4WD vehicles) and sports utility vehicles (SUV) mount the spare wheel to the rear luggage door of the vehicle, for example, Toyota Troop carriers and Nissan Patrols. However, many four wheel drive enthusiasts replace the vehicle manufacturer's rear bumper bar by a heavier quality bumper bar which is designed to carry two spare wheels thereby providing additional security when travelling in remote areas. Typically, enthusiasts travelling in remote areas will have replaced the manufacturers wheels (which are relatively heavy) by wider wheels with wider rugged terrain tyres which are much heavier than standard four wheel drive wheels.

While it is difficult for a single person to release a standard four wheel drive wheel from its mount it will be appreciated that it is even more difficult for a single person to release a rugged terrain wheel from a standard spare wheel mount or a bumper bar mount. Moreover, while it may be possible for some enthusiasts to release the spare wheel from the mount and use it to replace a damaged wheel/tyre, the damaged wheel has to be remounted on the spare wheel carrier which generally requires it to be lifted up to a metre above the ground which can be very difficult and dangerous in some circumstances.

It will be appreciated that many 4WD enthusiasts now tow a luggage trailer, camper van or caravan to remote places over rough terrain and many of those vehicles are also fitted with 4WD wheels to raise the bottom of the van to match the ground clearance of the towing vehicle. Consequently, such vehicles also have to carry one or two spare wheels/tyres which are also heavy and awkward to mount and dismount. The present invention also has application to such vehicles.

The present invention is aimed at providing a wheel carrier which alleviates the shortcomings of existing wheel carriers, particularly insofar as the weight or awkwardness of handling spare wheels is concerned. While the invention is particularly concerned with wheel carriers of the type which may be retrofitted to vehicles such as those previously mentioned, the invention also has application to wheel carriers which may be incorporated in new vehicles. Other aims and advantages of the invention may become apparent from the following description.

With the foregoing in view, the invention resides broadly in a wheel carrier for a vehicle, including:

a first component adapted to be secured on or to a vehicle;

a second component operatively connected to said first component for movement relative thereto from a stowed or upper position to an extended or lowered position; and a third component operatively connected to said second component for movement relative thereto from a stowed or upper position to an extended or lowered position, said third component including means for mounting a spare wheel thereto; and securing means for securing said third component in the stowed or upper position.

In another aspect, the invention resides broadly in a wheel carrier for a vehicle, including:

a first component adapted to be secured on or to a vehicle, said first component including load support means for supporting a load thereon;

a second component operatively connected to said first component for movement relative thereto from a stowed or upper position to an extended or lowered position; and a third component operatively connected to said second component for movement relative thereto from a stowed or upper position to an extended or lowered position, said third component including means for mounting a spare wheel thereto and load transfer means for transferring at least some of the weight of the spare wheel to the load support means of said first component.

In another aspect, the invention resides broadly in a wheel carrier for a vehicle, including:

a first component adapted to be secured on or to a vehicle;

a second component operatively connected to said first component for movement relative thereto about a generally horizontal first pivot axis from a stowed or upper position to an extended or lowered position; and a third component operatively connected to said second component for movement relative thereto about a generally horizontal second pivot axis from a stowed or upper position to an extended or lowered position, said third component including means for mounting a spare wheel thereto, and said second pivot axis being spaced from said first pivot axis and higher than said first pivot axis when said second component is in its stowed or upper position on a vehicle and said second pivot axis being lower than said first pivot axis when said second component is in its extended or lowered position.

In yet another aspect, the invention resides broadly in a wheel carrier for a vehicle, including:

a first component adapted to be secured on or to a vehicle, said first component including securing means for securing the wheel carrier to the vehicle;

a second component operatively connected to said first component for movement relative thereto about a generally horizontal first pivot axis from a stowed or upper position to an extended or lowered position; and a third component operatively connected to said second component for movement relative thereto about a generally horizontal second pivot axis from a stowed or upper position to an extended or lowered position, said second pivot axis being spaced from said first pivot axis and said third component including mounting means for mounting a spare wheel of the vehicle thereto;

said securing means of said first component and said mounting means of said third component being so made and arranged to hold the hub of the spare wheel in a predetermined position spaced from the cabin of the vehicle.

Preferably, said securing means is arranged to secure said third component to said first component in a manner whereby the weight of the spare wheel is effectively transferred directly to the first component.

Preferably, the components are so made and arranged that the spare wheel is held in a substantially vertical orientation when in the stowed position, that is, with the rolling axis of the wheel substantially horizontal.

It is also preferred that the components are so made and arranged that the wheel is held in a substantially vertical orientation when the third component is in the lowered position. Preferably, the wheel carrier includes adjustment means for adjusting the lowered height of the third component so that the wheel is substantially vertical when the second component and the third component are in the fully lowered position. It will be appreciated that such adjustment means is aimed at setting the fully down position for a particular vehicle and tyre combination to which the wheel carrier may be mounted. For example, a 4WD vehicle with 15-inch rims will require the fully down position to be lower than a vehicle with 18-inch rims etc and accordingly one form of adjustment means will allow such semi-permanent pre-setting to be done. However, in another form, the adjustment means allows the height to be adjusted at any time so that the spare wheel may be lowered to an optimum position to suit the terrain where a tyre/wheel may have to be replaced, for example, if the vehicle is on an upslope or a down slope.

Preferably, said first component includes first securing means for securing the wheel carrier to the vehicle and second securing means for securing the third component to the first component. In such form it is preferred that the first and second securing means cooperate to the extent that the wheel weight load on the spare wheel mounting means of the third component is substantially transferred to the first component and that the first component is made and arranged so as to hold the hub of the spare wheel in a predetermined position spaced from said first securing means.

In such form of the invention, it is preferred that the predetermined position of the wheel hub is determined by reference to the width of the spare tyre so that when the spare wheel is in the stowed position, the inner wall of the tyre (the wall or wall portion adjacent the vehicle cabin) is close to the cabin, and preferably as close as possible without causing damage to the cabin.

It is also preferred that the spare wheel mounting means of the third component include a metal plate of a size and shape allowing at least three diagonally opposite wheel studs to secure the spare wheel thereto and that the first component include a complementary plate or the like of at least a similar size to provide for effective face to face engagement of the two plates. In such form, it is preferred that a centre bolt and nut be provided to secure the third component to the first component and that such be provided centrally of the at least three wheel studs when in the stowed position.

Preferably, said components are so made and arranged that said second pivot axis is spaced from said first pivot axis and higher than said first pivot axis when said second component is in its stowed or upper position on a vehicle. In such form, it is also preferred that said second pivot axis is lower than said first pivot axis when said second component is in its extended or lowered position.

Preferably, the components are so made and arranged that when the second component is in the stowed or upper position it is juxtaposed with the first component such that the first component extends further from the vehicle beyond the second component. In one such preferred form, the second component comprises a frame having two spaced apart side members which together straddle the first component. Such arrangement allows the second component to stand close to the vehicle while the first component extends through the first component which in turn allows the third component to rest against the portion or part of the first component extending through the second component. Consequently, when in the stowed position, the weight of the spare wheel is transferred directly to the first component and the second component carries little or no weight.

In one such arrangement, the third component includes a connecting member or portion which is arranged or allowed to also pass between the two spaced apart frame members of the second component if desired for some spare wheels depending on size.

Preferably, biasing means are provided to bias the second component towards the stowed or upper position, and it is also preferred that biasing means be provided to bias the third component towards the stowed or upper position. In a much preferred form, the biasing means includes gas struts which are arranged to charge as each of the second and third components are lowered against the bias under the weight of the spare wheel thereby increasing the biasing force so as to assist in lifting the wheel being replaced into the spare wheel stowed position after it has been replaced. In other forms of the invention, clock springs or torsion springs could be mounted on the respective pivot axes to create the desired bias.

In one preferred form of the invention, where the second component comprises two spaced apart frame members two gas struts are mounted in parallel, one on each side of the space with one end connected to its respective frame member and the other end of each connected to the first component in the same spaced apart relationship. Similarly, it is also preferred that two spaced apart gas struts be used to bias the third component towards the stowed or upper position, the gas struts also being mounted at one end to the spaced apart frame members of the second component and to spaced apart mounting points on the third component.

Preferably, the biasing means is selected and arranged to allow a person to lift the spare wheel from the lowered or deployed position to the stowed position without undesired body strain and similarly to lower the spare wheel from the stowed position to the lowered or deployed position without undesirable body strain.

In still yet another aspect, the invention resides broadly in a wheel carrier including:

a fixed mounting portion or component adapted to be securely mounted to a vehicle;

a first pivotable portion or component pivotally mounted at a proximal end to the fixed mounting portion and having a distal end remote from the proximal end, the pivotal mounting being for pivoting the first pivotable portion from a stowed position alongside the vehicle to a deployed position away from the vehicle; and a second pivotable portion or component pivotally mounted to the distal end of the first pivotable portion or component and having a wheel mounting for demountably mounting a vehicle wheel thereto, the pivotal mounting being arranged such that the second pivotable portion or component is alongside or adjacent the first pivotable portion or component in the stowed position and away from and below the first pivotable portion or component in the deployed position.

Preferably, the fixed mounting portion or component is aligned vertically or near to vertical when the vehicle is oriented in its normal orientation of level ground. In such form, the first and second pivotable portions or components are also vertical or close to vertical when in the stowed position whereby the spare wheel mounted to the wheel mount may be stowed in a substantially vertical attitude.

It is also preferred that mechanical arrangements are provided, such as levers, struts, cables or combinations of same, to keep the second pivotable portion substantially parallel to the fixed mounting portion through the pivoting motion from the stowed position to the deployed position and vice versa. The second pivotable portion generally depends downward from the distal end of the first pivotable portion, and in the preferred arrangement, is constrained to remain substantially vertical through deployment and stowage between the stowed and deployed positions.

In another aspect, the present invention resides broadly in a method of mounting a wheel to a wheel carrier having a fixed mounting portion fixedly mounted to a vehicle; a first pivotable portion pivotally mounted at a proximal end to the fixed mounting portion and having a distal end remote from the proximal end; and a second pivotable portion pivotally mounted to the distal end of the first pivotable portion and having a wheel mounting for mounting the vehicle wheel thereto, the method including:

mounting the wheel to the wheel mount, pivoting the first and second pivotable portions from a deployed position away from the vehicle to a stowed position alongside the vehicle.

In still yet another aspect, the invention resides broadly in a rear bumper bar for a vehicle, including:

a first member adapted to extend substantially across the width of the vehicle, the first member including connecting means for connecting it to the chassis of the vehicle and mounting means for mounting one or two spare wheel carriers of the type previously described thereto.

In still yet another aspect, the invention resides broadly in a bulbar for a vehicle, including:

a first member adapted to extend substantially across the width of the vehicle, the first member including connecting means for connecting it to the chassis of the vehicle and mounting means for mounting one or two spare wheel carriers of the type previously described thereto.

Preferably, said connecting means includes an opening in the rear bumper bar or the bulbar for the or each wheel carrier, the opening being adapted to receive therein a mounting member of the wheel carrier.

In order that the invention may be more readily understood and put into practical effect, reference will now be made to the accompanying drawings which illustrate a preferred embodiment of the invention and wherein.

Figure 1A:
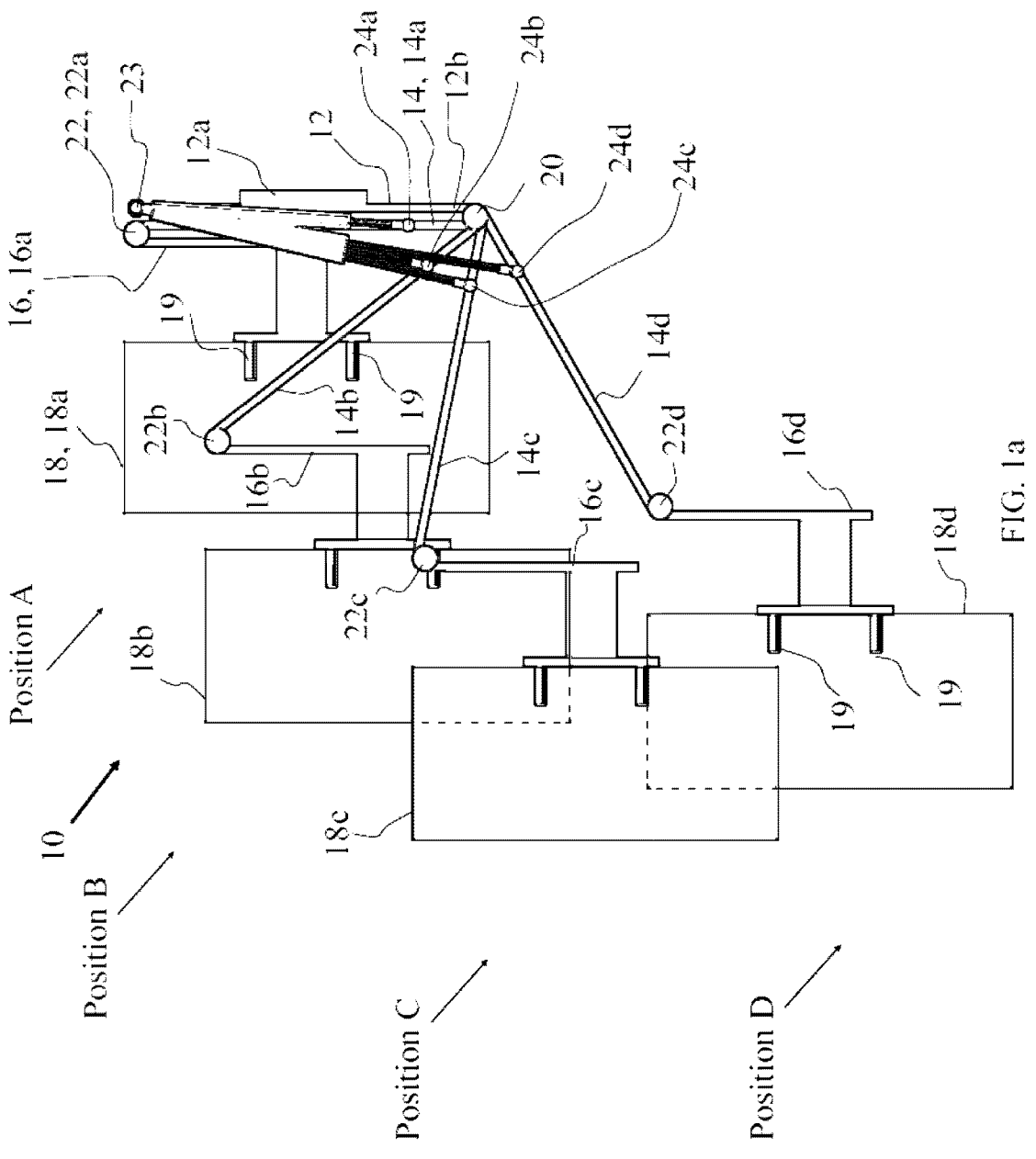
FIG. 1a is a diagrammatic side view of a wheel carrier according to the invention showing the wheel carrier at four positions between and including the stowed or upper position and the lowered or deployed position.
Figure 1B:
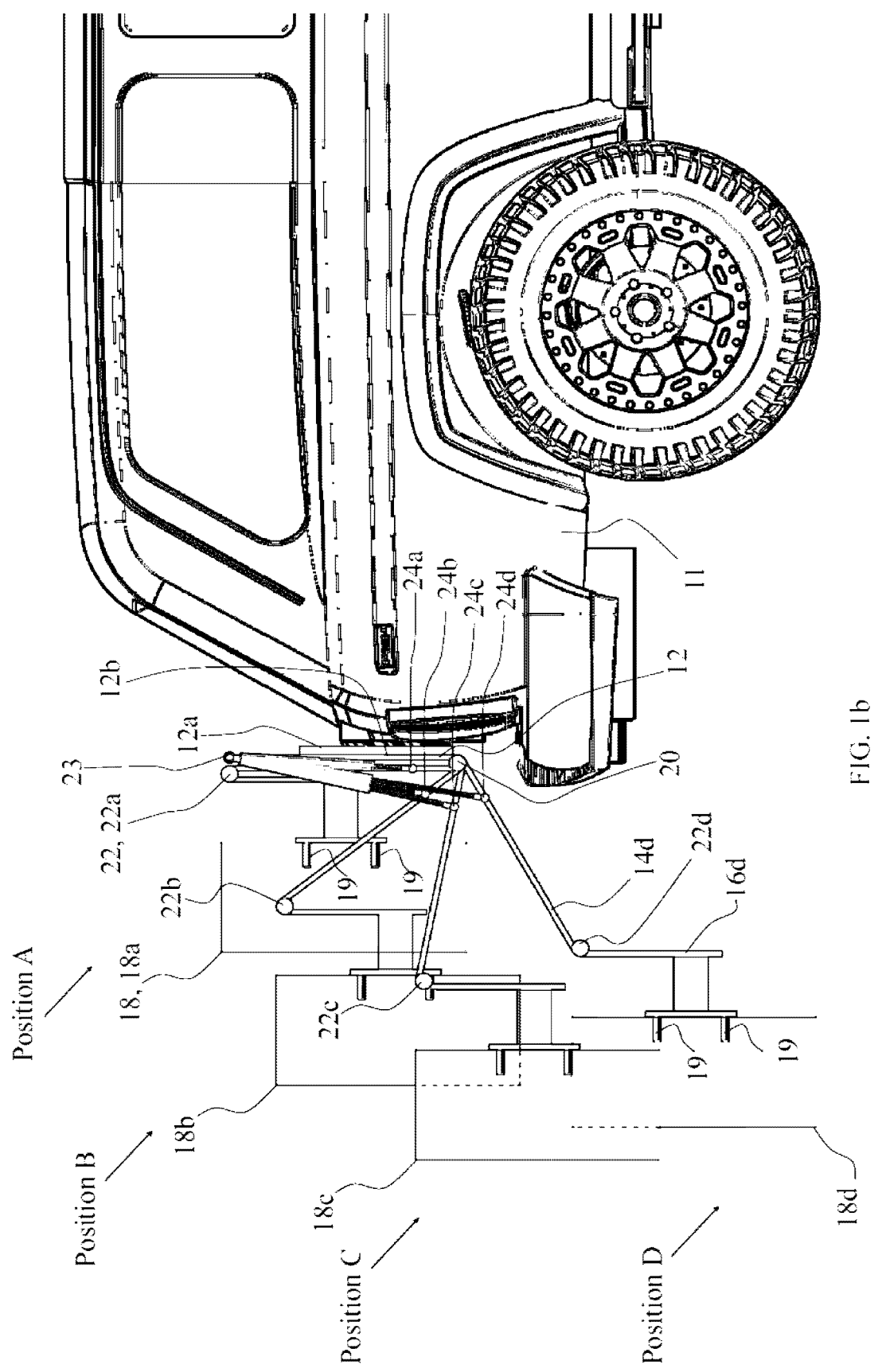
FIG. 1b is the same schematic side view of the wheel carrier as in FIG. 1 but with the wheel carrier mounted on a 4WD vehicle.
Figure 2A:
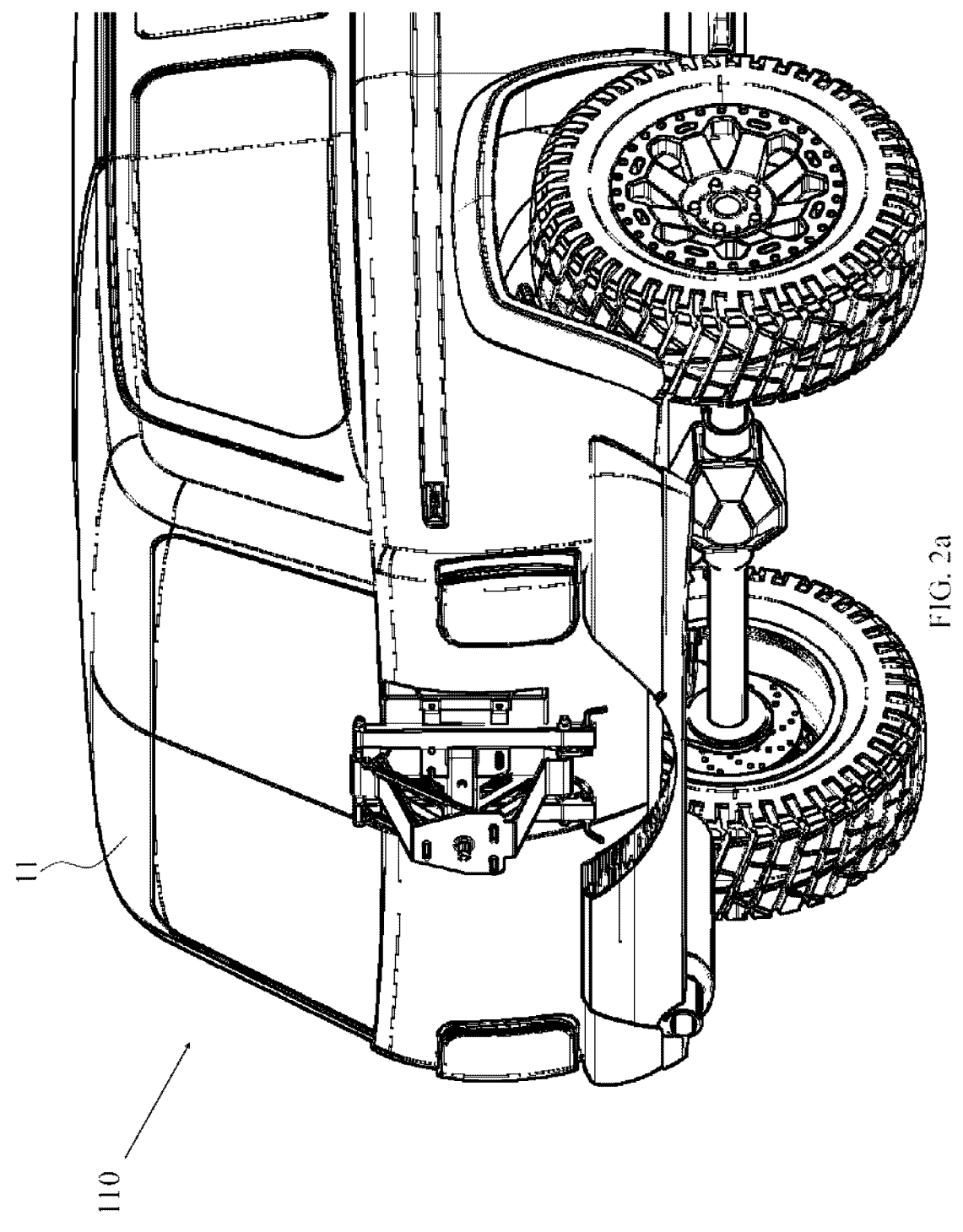
FIG. 2a is a pictorial representation of a wheel carrier according to the invention mounted to the back door of a 4WD vehicle in the fully stowed position.
Figure 2B:
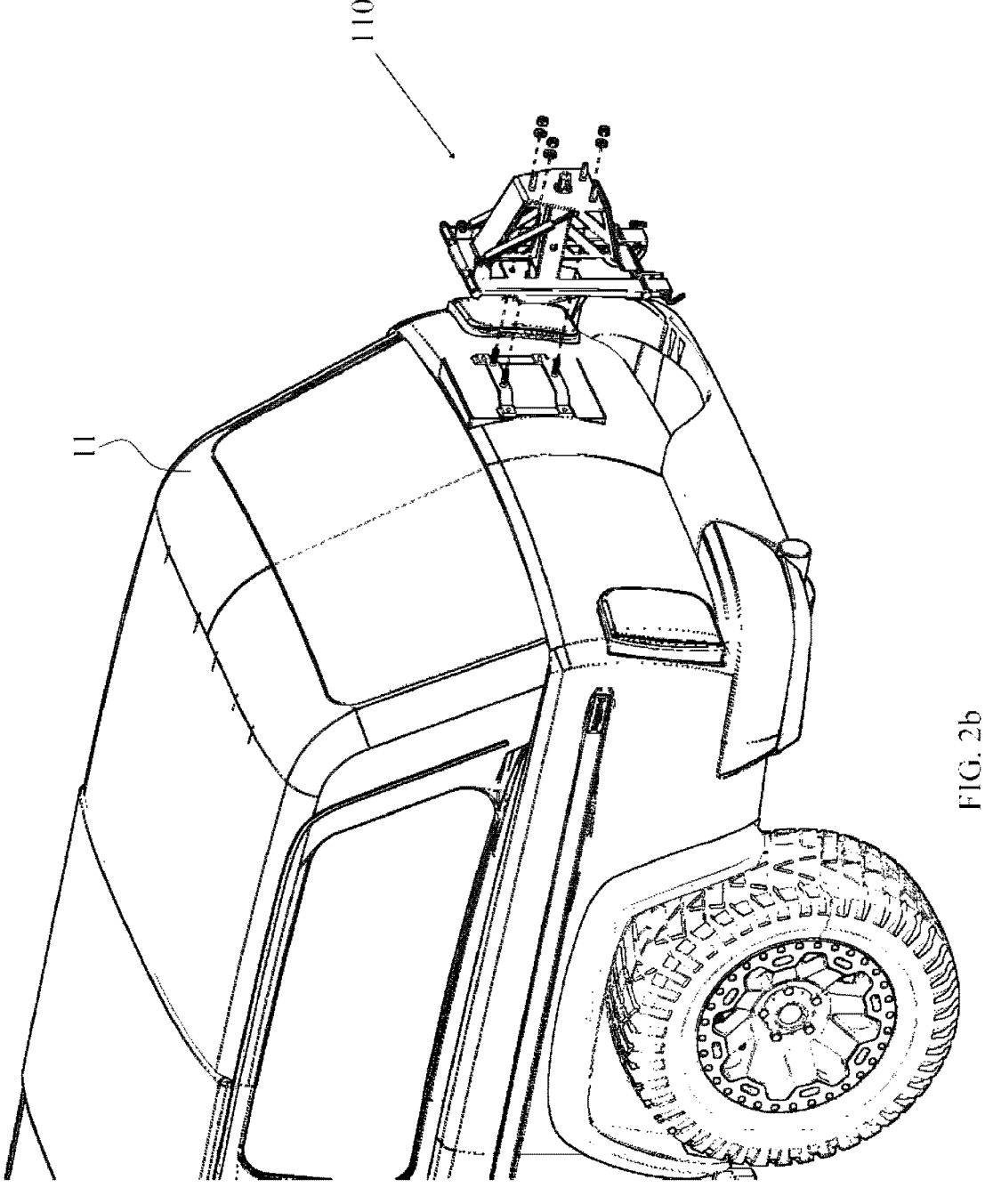
FIG. 2b is a pictorial representation of a wheel carrier according to the invention mounted to the back door of a 4WD vehicle in line for assembly in the fully stowed position.
Figure 3A:
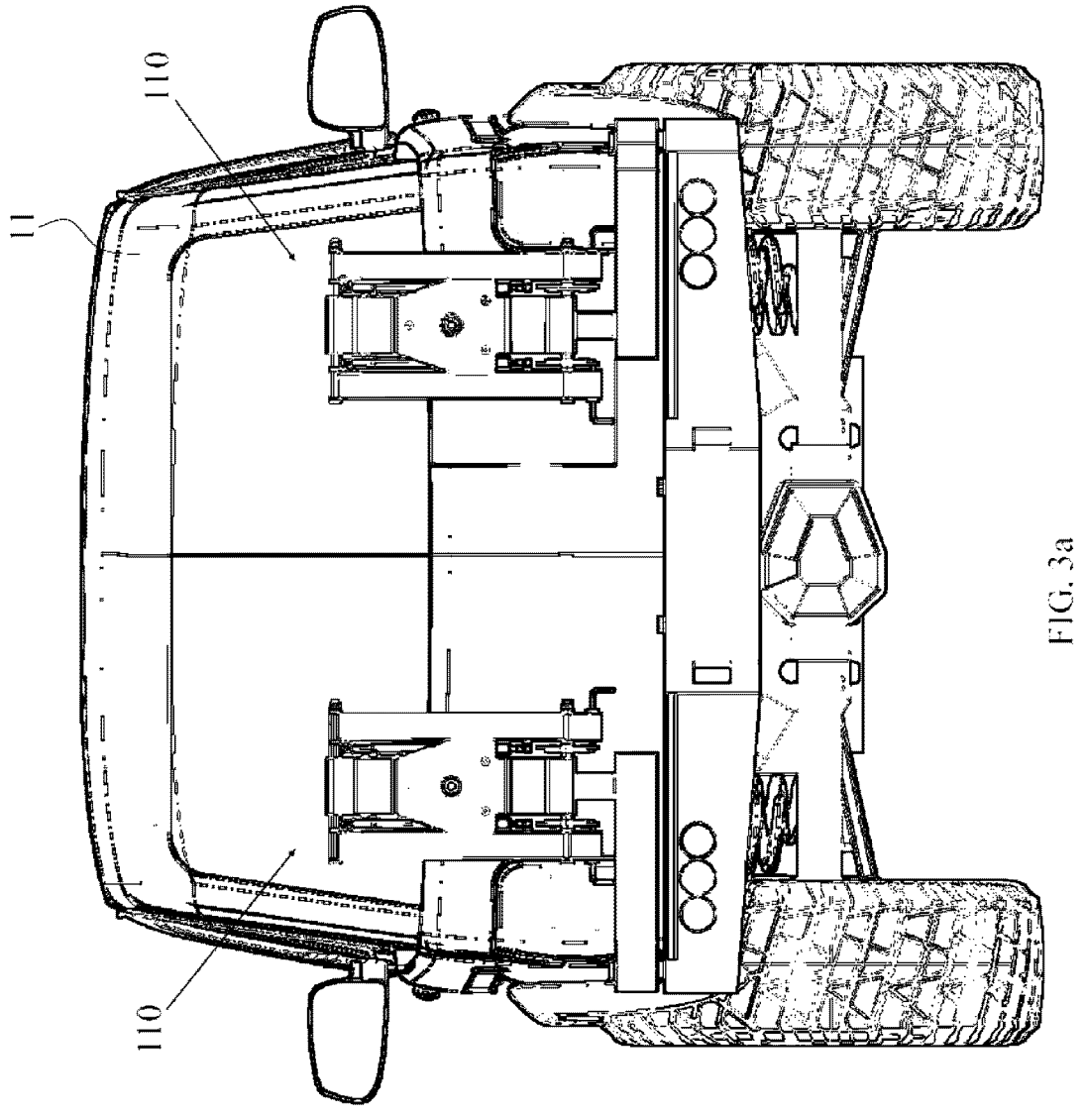
FIG. 3a is a pictorial representation of two wheel carriers according to the invention mounted to the rear protection bar of a 4WD vehicle in the fully stowed position.
Figure 3B:
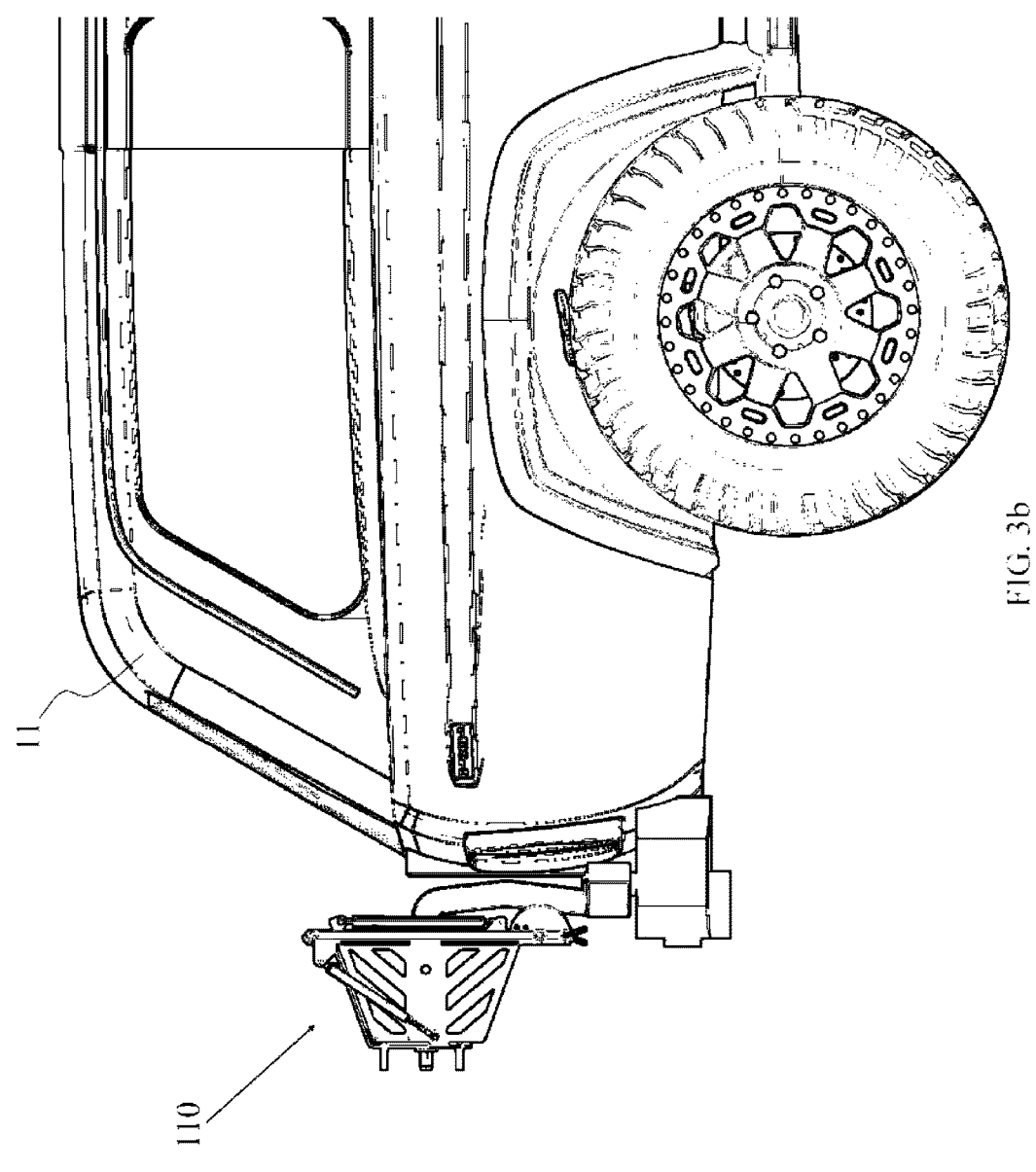
FIG. 3b is a side elevation of the wheel carriers mounted to the vehicle as in FIG. 3a in the fully stowed position.
Figure 3C:
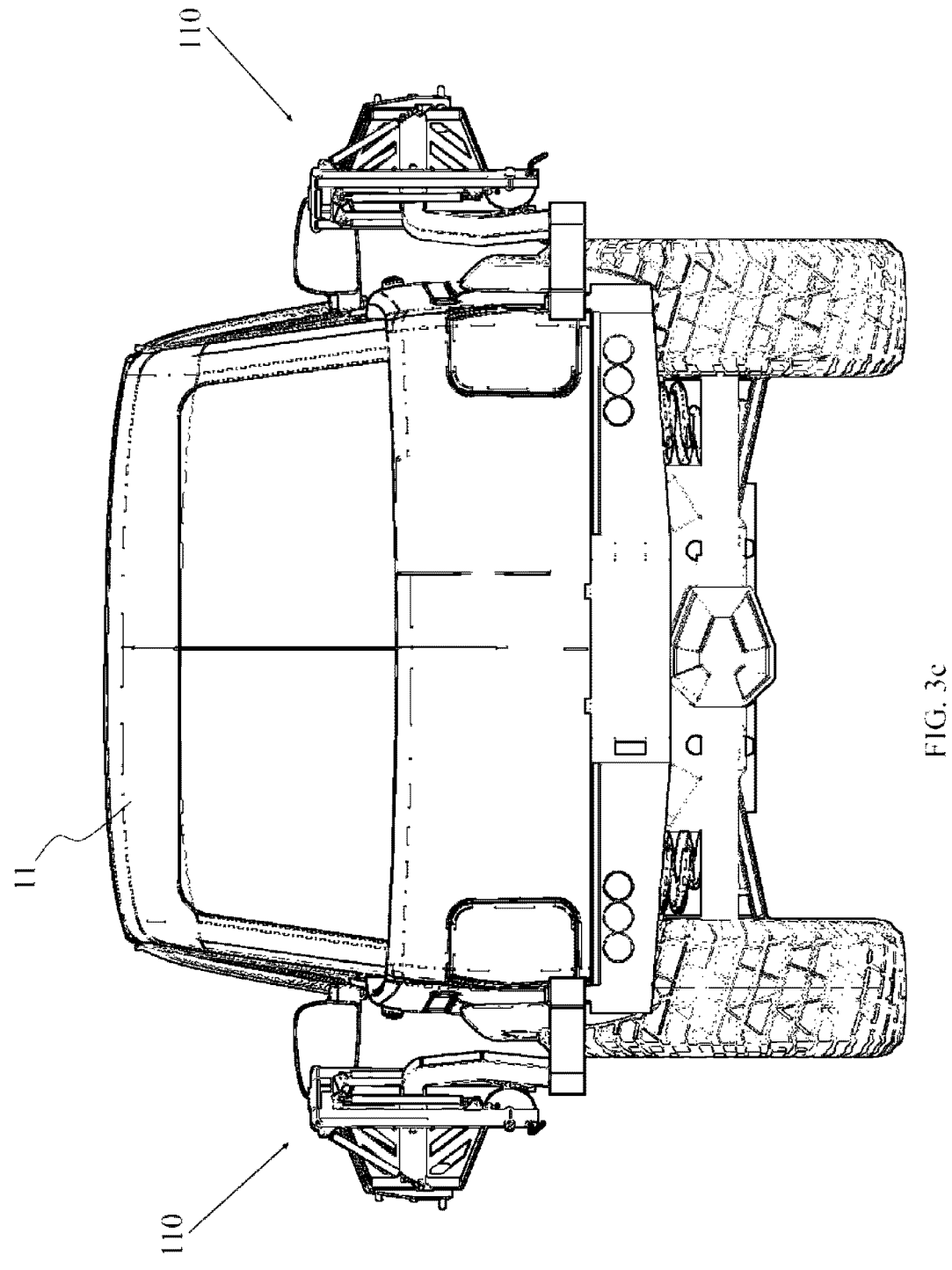
FIG. 3c is a pictorial representation of the two wheel carriers shown in FIG. 3a after swinging outwards to give access to the luggage compartment.
Figure 3D:
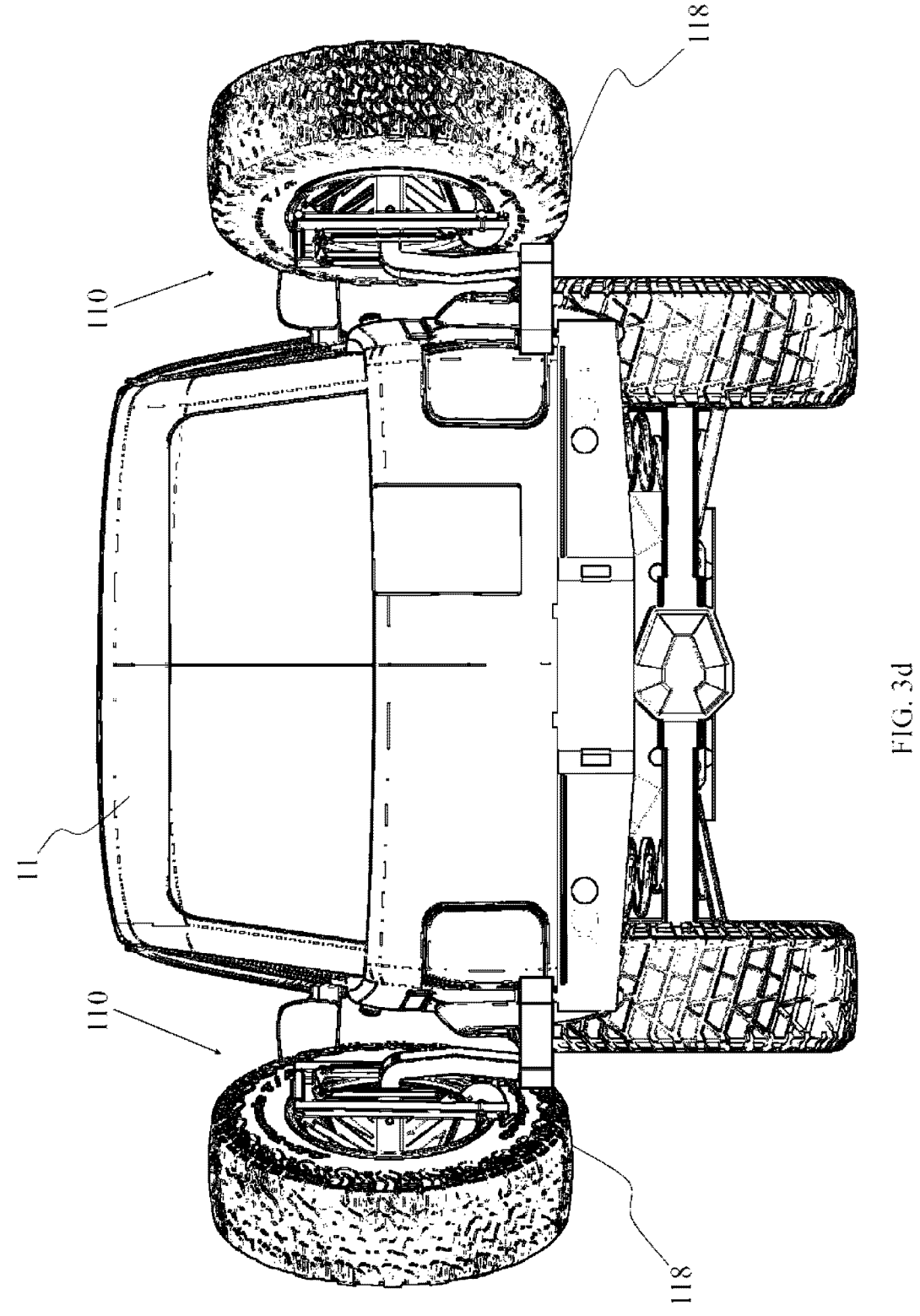
FIG. 3d is a pictorial representation of the two wheel carriers shown in FIG. 3c with spare wheels mounted thereon after swinging outwards to give access to the luggage compartment.
Figure 5:
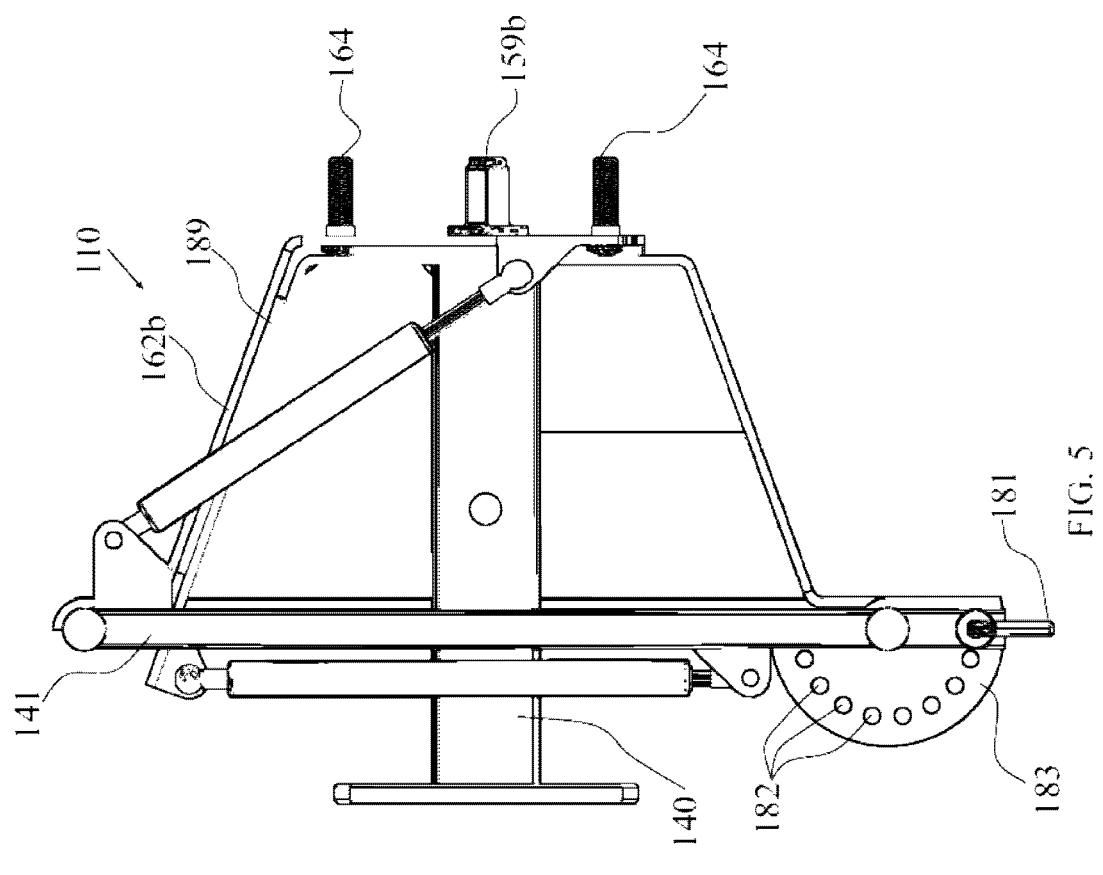
FIG. 5 is a side elevation of the wheel carrier of FIG. 4 from one side in the fully stowed position.
Figure 4:
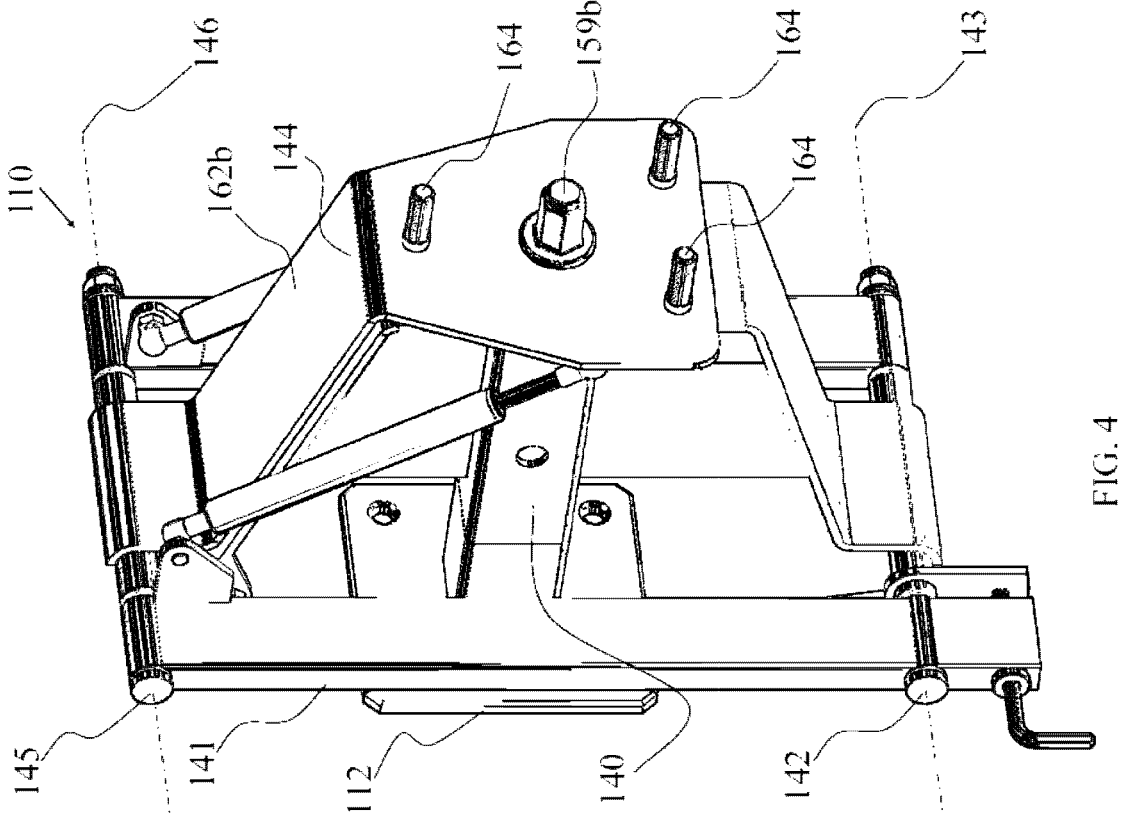
FIG. 4 is a pictorial representation of the wheel carrier shown in FIG. 2 or wheel carriers shown in FIG. 3 removed from the vehicle when seen from the rear on one side in the fully stowed position.
Figures 6, 7:
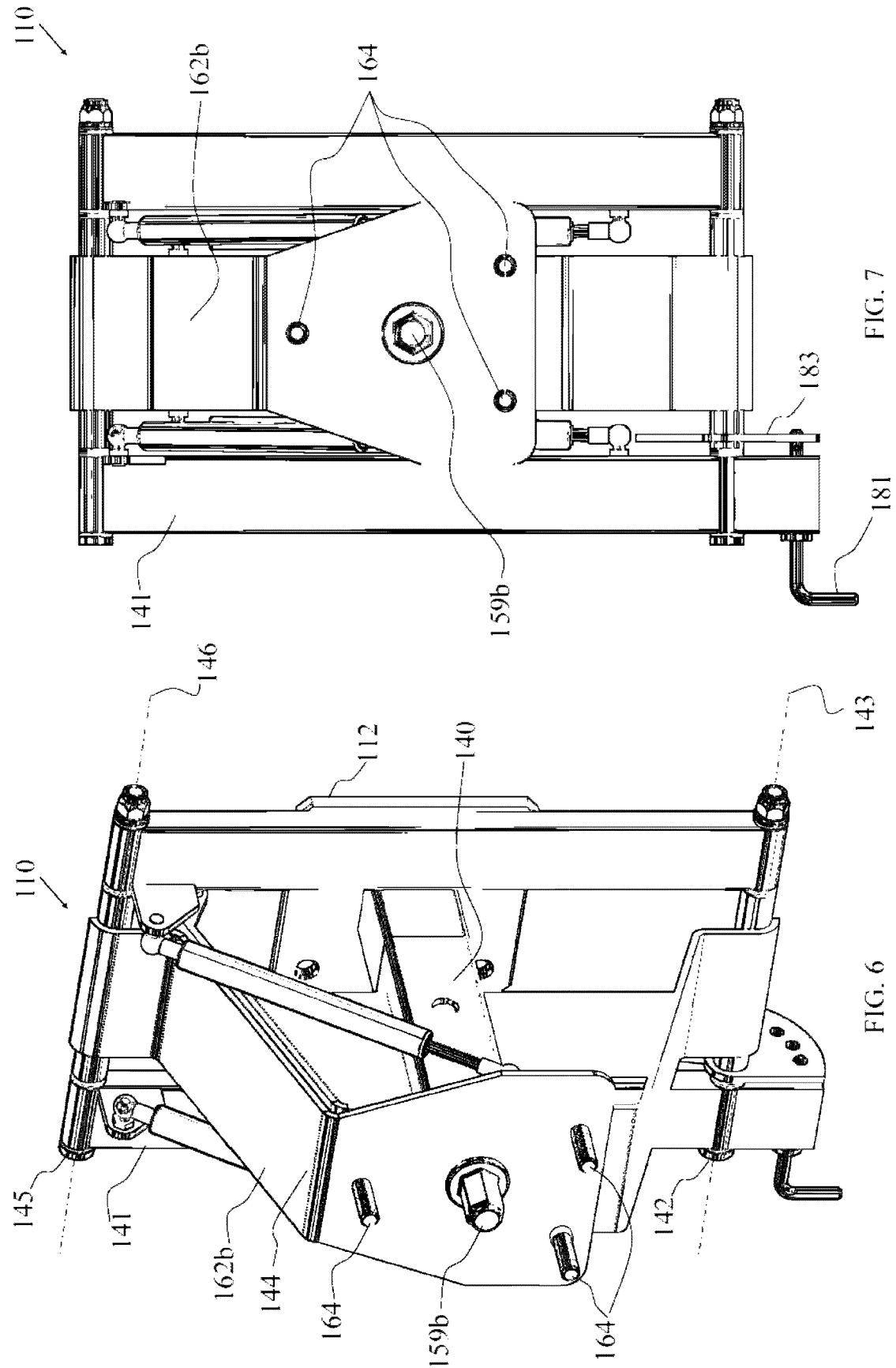
FIG. 6 is a pictorial representation of the wheel carrier of FIG. 4 from the rear on the other side in the fully stowed position in the fully stowed position.
FIG. 7 is a rear elevation of the wheel carrier of FIG. 4 in the fully stowed position.
Figures 8, 9:
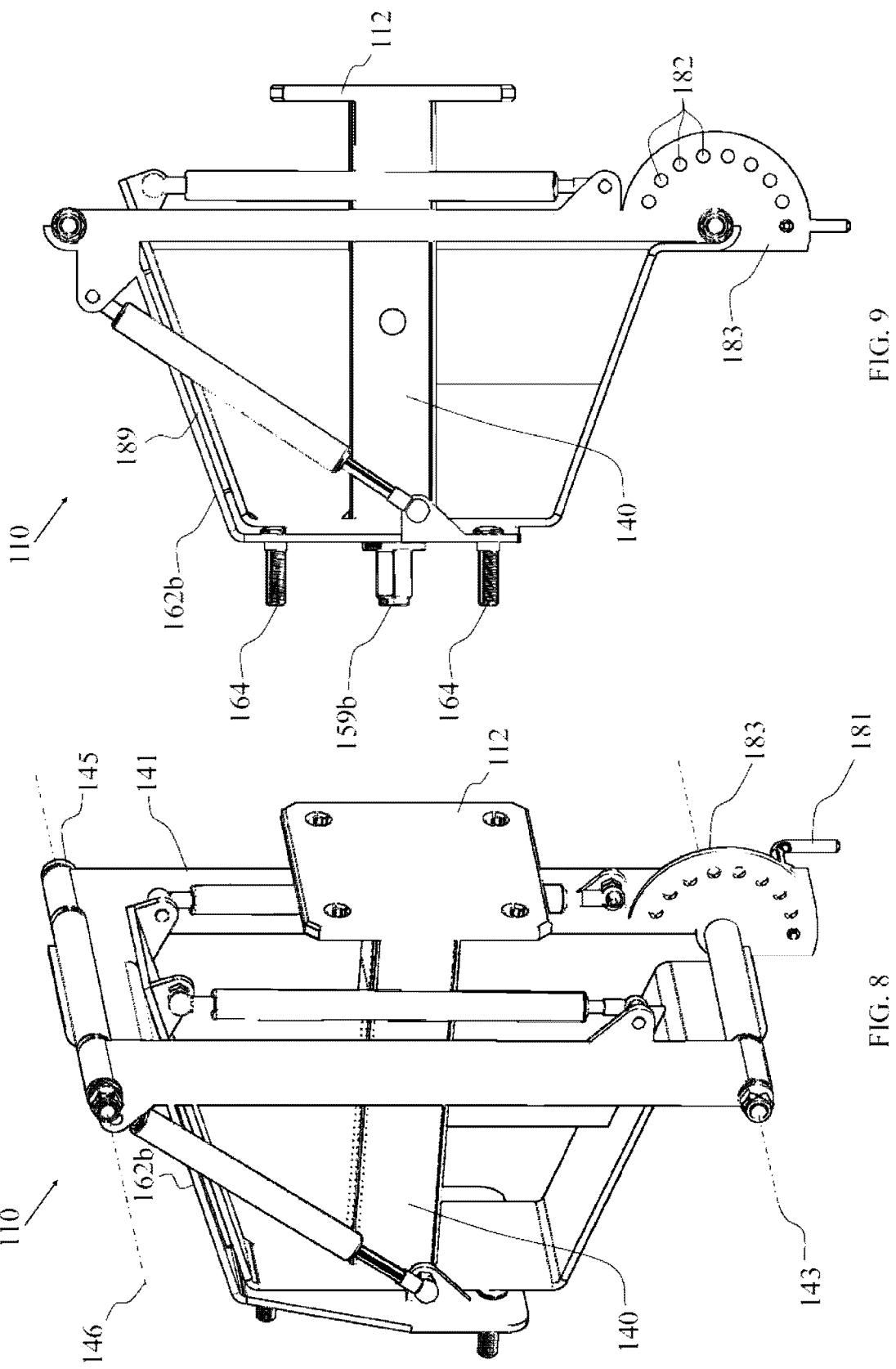
FIG. 8 is a pictorial representation of the wheel carrier of FIG. 4 from the front on one side in the fully stowed position.
FIG. 9 is a side elevation of the wheel carrier of FIG. 4 from the same side as in FIG. 8 in the fully stowed position.
Figures 10, 11:
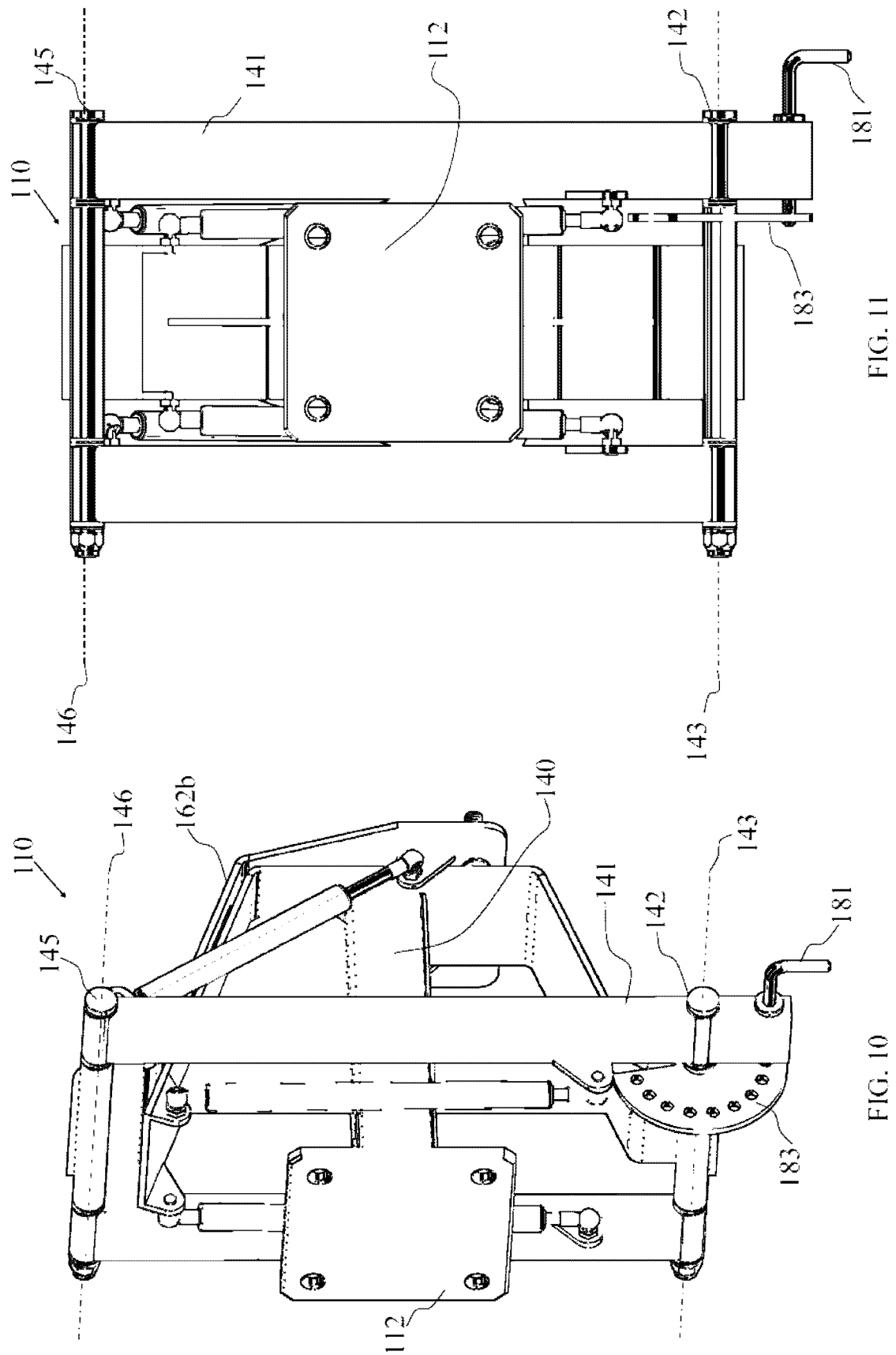
FIG. 10 is a pictorial representation of the wheel carrier of FIG. 4 from the front on one side in the fully stowed position.
FIG. 11 is a front elevation of the wheel carrier of FIG. 4 in the fully stowed position.
Figure 13:
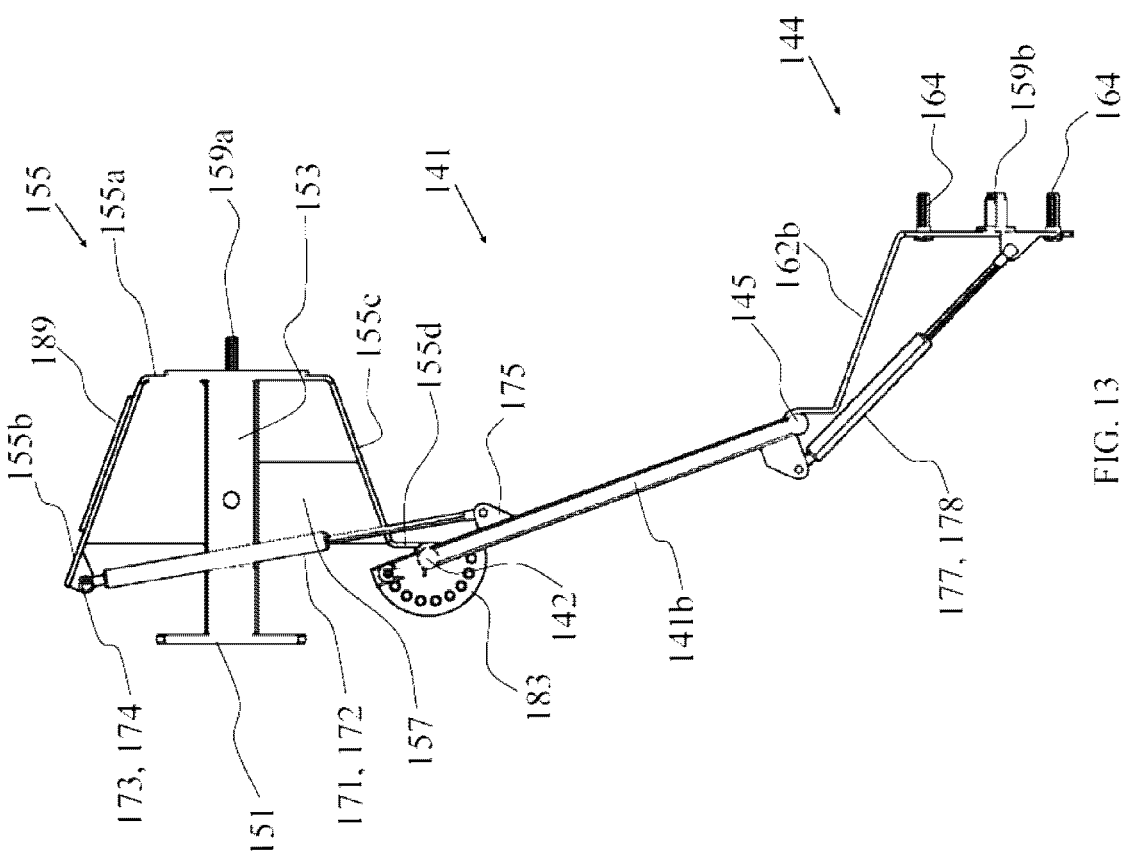
FIG. 13 is a side elevation of the wheel carrier of FIG. 4 in the fully lowered position.

The wheel carrier 10 illustrated in FIG. 1 includes a fixed mounting portion or component 12 adapted to be mounted to the rear door or rear bumper bar (or rear protection bar) of a vehicle 11.

In the form illustrated, the fixed mounting portion or component is intended to be mounted to an existing wheel mount of a rear protection bar of the type which is often retro fitted to 4WD vehicles. Some of those rear protection bars have two spare wheels mounted thereon and the spare wheel/s are mounted to a post upstanding from the rear protection bar and arranged to swing outwards from immediately behind the luggage compartment access door to allow access to the luggage compartment.

However, it will be appreciated that the fixed mounting portion could be mounted to other structures of the vehicle and the fixed mounting portion may take other forms suitable to different vehicles and different rear protection bars. For example, in the case of a small truck the wheel carrier may be mounted to the side of the truck chassis and in the case of a caravan, the wheel carrier might be mounted to the rear end or the front end of the van depending on the structure available.

In the general form illustrated in FIG. 1, the fixed mounting portion 12 includes a steel plate or beam 12a which includes bolt holes therethrough (not shown) positioned for bolting to the existing wheel mount to a rear protection bar and a vertically arranged steel member 12b typically of RHS construction which is welded or bolted to the plate 12a and extends upwardly and downwardly therefrom to form an extended fixed mounting portion or member.

A first pivotable beam 14 is pivotally mounted at one end (the proximal end) to the lower end of extended fixed mounting portion 12b by way of a first horizontal pivot shaft 20 which extends generally parallel to the rear end of the vehicle (or the rear protection bar) for pivoting movement relative thereto through an arc of up to 180 degrees from a fully stowed or upper position to a fully extended or down position.

A second pivotable or pivoting beam 16 is mounted to the opposite end (the distal end) of the first pivotable beam by way of a second pivot shaft 22. A wheel support plate 17 is mounted to the second pivotable beam 16 and wheel mount and wheel 18 shown schematically are mounted thereto by bolts 19 in the same manner as spare wheels are mounted to the rear of 4WD vehicles.

FIG. 1 illustrates four positions of the spare wheel moving from the fully stowed or upper position at "A" through partly lowered intermediate positions "B" and "C" to a fully extended or fully down position at "D". Various components have been labelled with the same reference numbers as before but with an "a", "b", "c" or "d" when in the respective A, B, C, or D positions. Thus, the moving components in the fully stowed position are indicated at 14a, 16a and 18a, in the fully down or deployed position at 14d, 16d and 18d and at two intermediate positions at 14b, 16b and 18b, 14c, 16c and 18c. The second pivot also moves by virtue of it being located at the distal end of the first pivotable arm as indicated at 22a, 22b, 22c and 22d.

A gas strut 24, is connected at one end to the fixed beam or plate 12 adjacent its upper end at 23 and at its other end to the first pivotable beam 14, as indicated at 24a, 24b, 24c and 24d. Advantageously, the gas strut is biased to close thereby biasing the first pivotable beam to the fully stowed or fully up position so as to assist with raising the spare wheel to the fully stowed position. Further, as the spare wheel is lowered the bias towards the stowed position increases allowing a person to more easily lift the replaced wheel from the ground position to an intermediate position where the person is in a more suitable lifting position.

The second pivotable beam 16 is allowed to swing against the friction provided by a pin lock 27 (not visible) mounted on pivot shaft 22 (which assists to keep the wheel mount and wheel substantially at or close to vertical in movement from the stowed position to the deployed position and vice versa).

The wheel carrier 110 illustrated in FIGS. 2 to 27 operates in much the same manner as the wheel carrier 10 illustrated in FIG. 1 and accordingly the same item numbers will be used to reference corresponding items or components except prefaced by a "1". Similarly, where different components are referred to the same item numbers will also be used where possible but preface by a "2" or a "3" or a "4" instead of a "1" as the case may be.

It will be seen that the wheel carrier 110 does have some advantages which will be appreciated from the following description. Wheel carrier 110 like wheel carrier 10 has three main components, a first component 140 which is adapted to be secured to the rear door or rear bumper bar or rear protection bar of a 4WD vehicle such as a Toyota Landcruiser wagon, a second component 141 which is connected to the first component at one end by a horizontal pivot shaft 142 and arranged to rotate about horizontal pivot axis 143 from a stowed or fully raised position as can be seen in FIGS. 2 to 12 to a fully extended or lowered position as can be seen in FIGS. 13 to 21 through various intermediate positions as can be seen in FIGS. 22 to 27 and a third component 144 which in turn is connected to the second component at its other end by a pivot pin 145 and arranged to rotate about horizontal pivot axis 146 which is parallel to pivot axis 143 and spaced therefrom.

Figure 12:
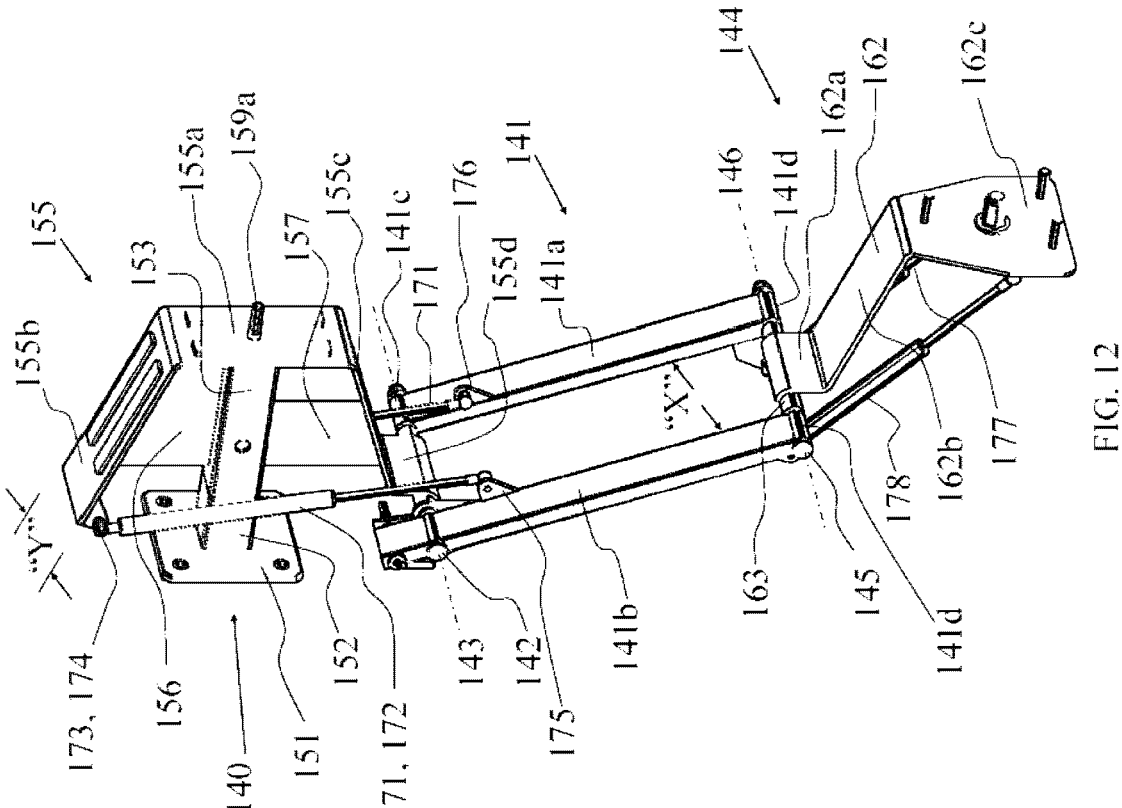
FIG. 12 is a pictorial representation of the wheel carrier of FIG. 4 from the front on one side in the fully lowered position.
Figure 15:
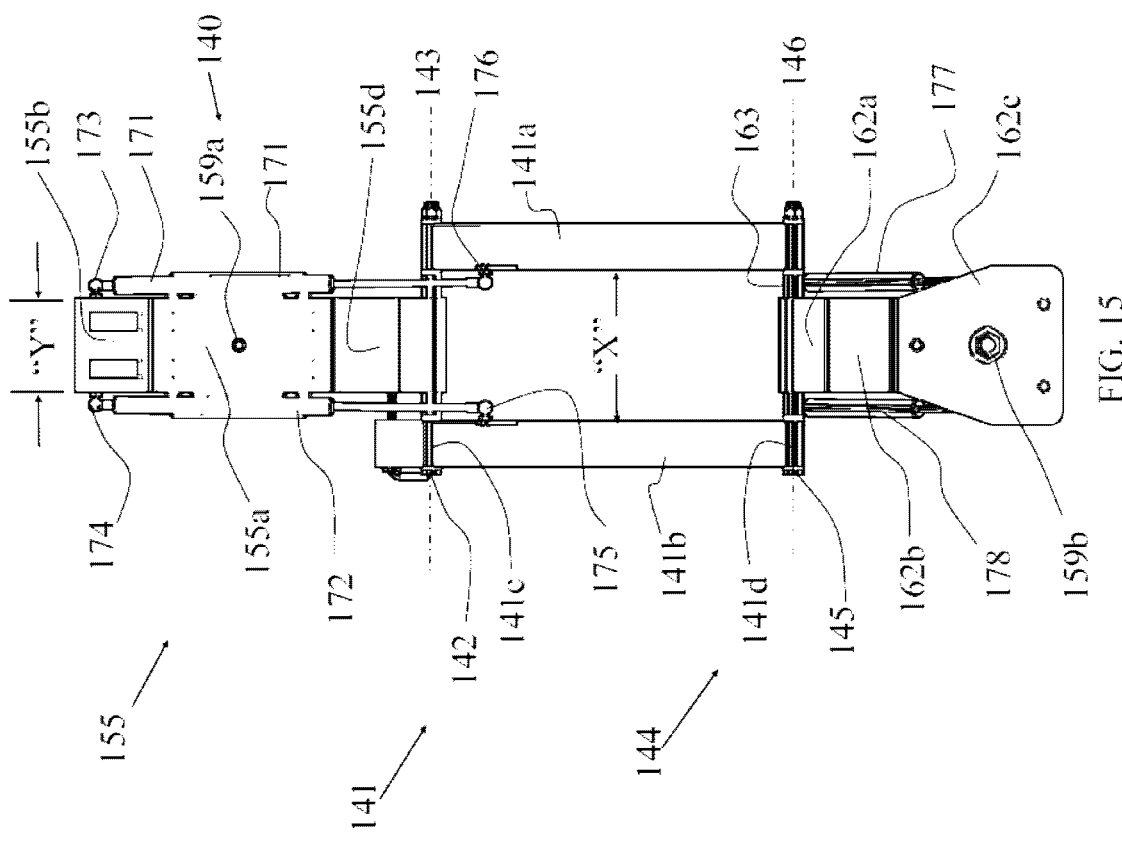
FIG. 15 is a rear elevation of the wheel carrier of FIG. 4 in the fully lowered position.
Figure 14:
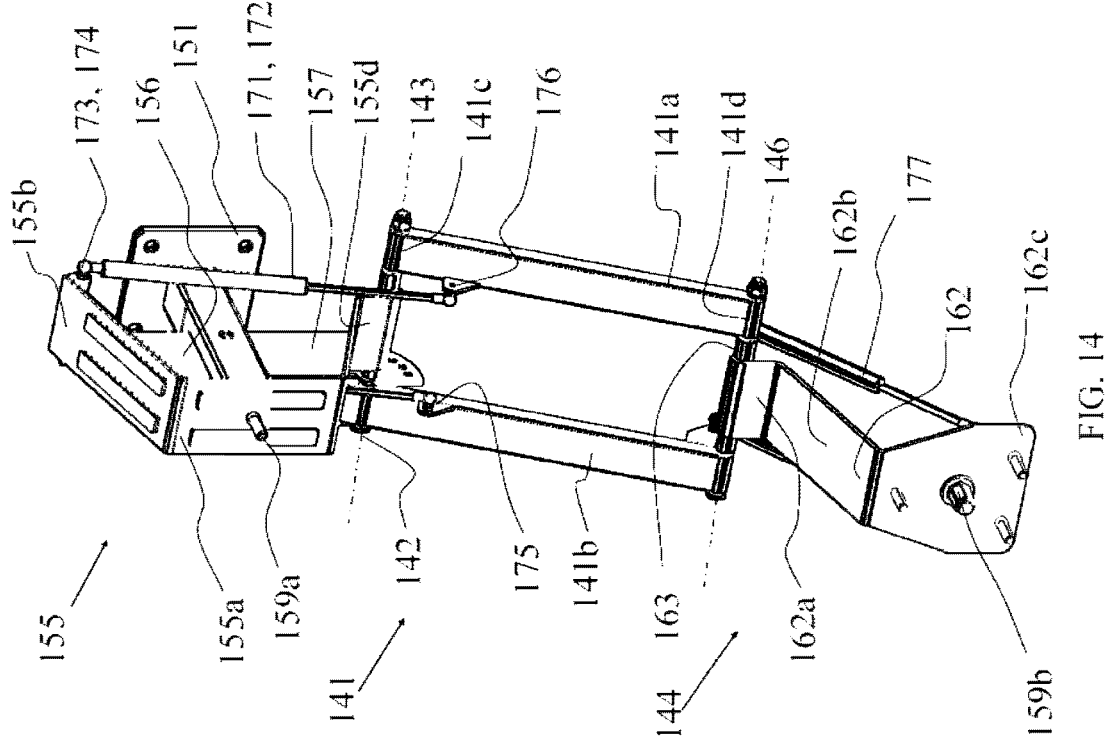
FIG. 14 is a pictorial representation of the wheel carrier of FIG. 4 from the rear on one side in the fully lowered position.
Figure 17:
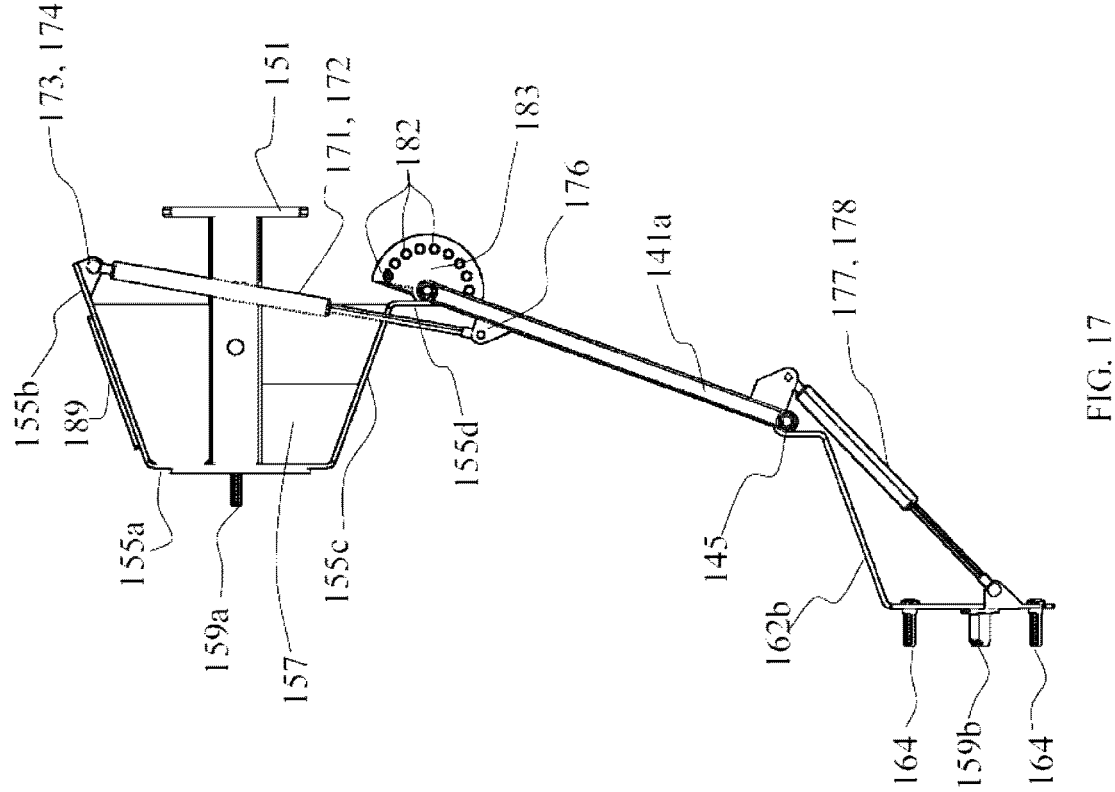
FIG. 17 is a side elevation of the wheel carrier of FIG. 4 in the fully lowered position.
Figure 16:
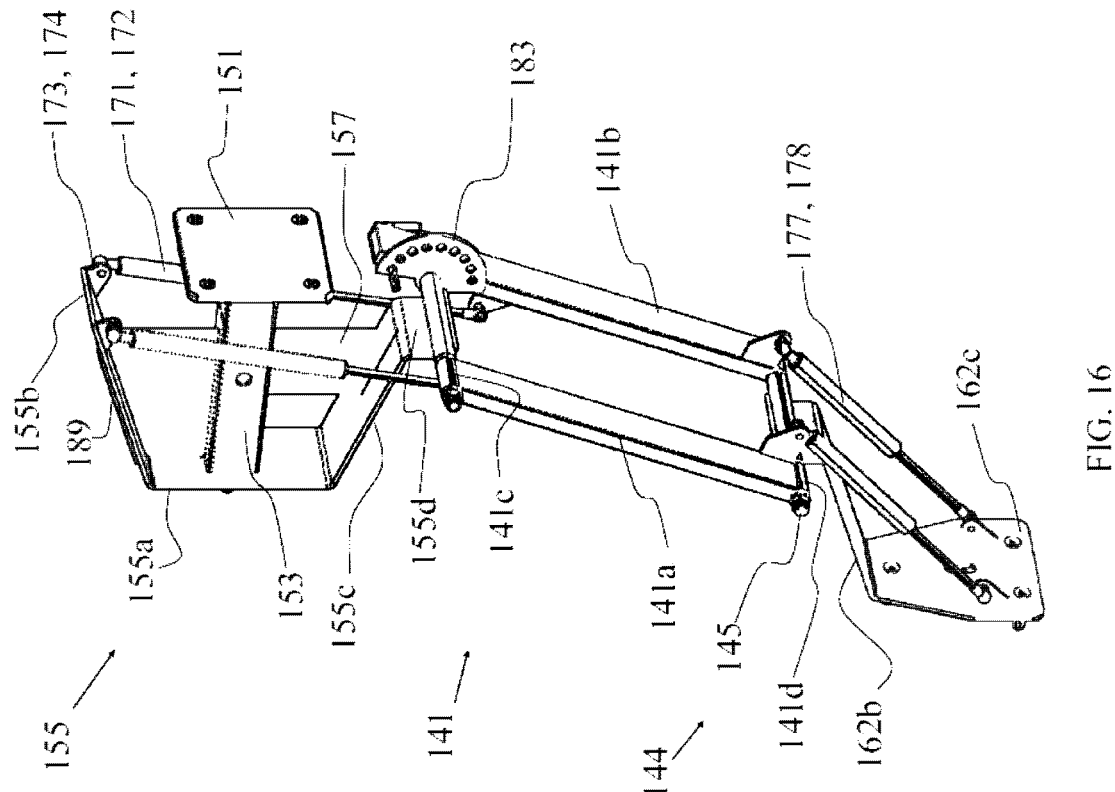
FIG. 16 is a pictorial representation of the wheel carrier of FIG. 4 from the front on one side in the fully lowered position.
Figures 18, 19:
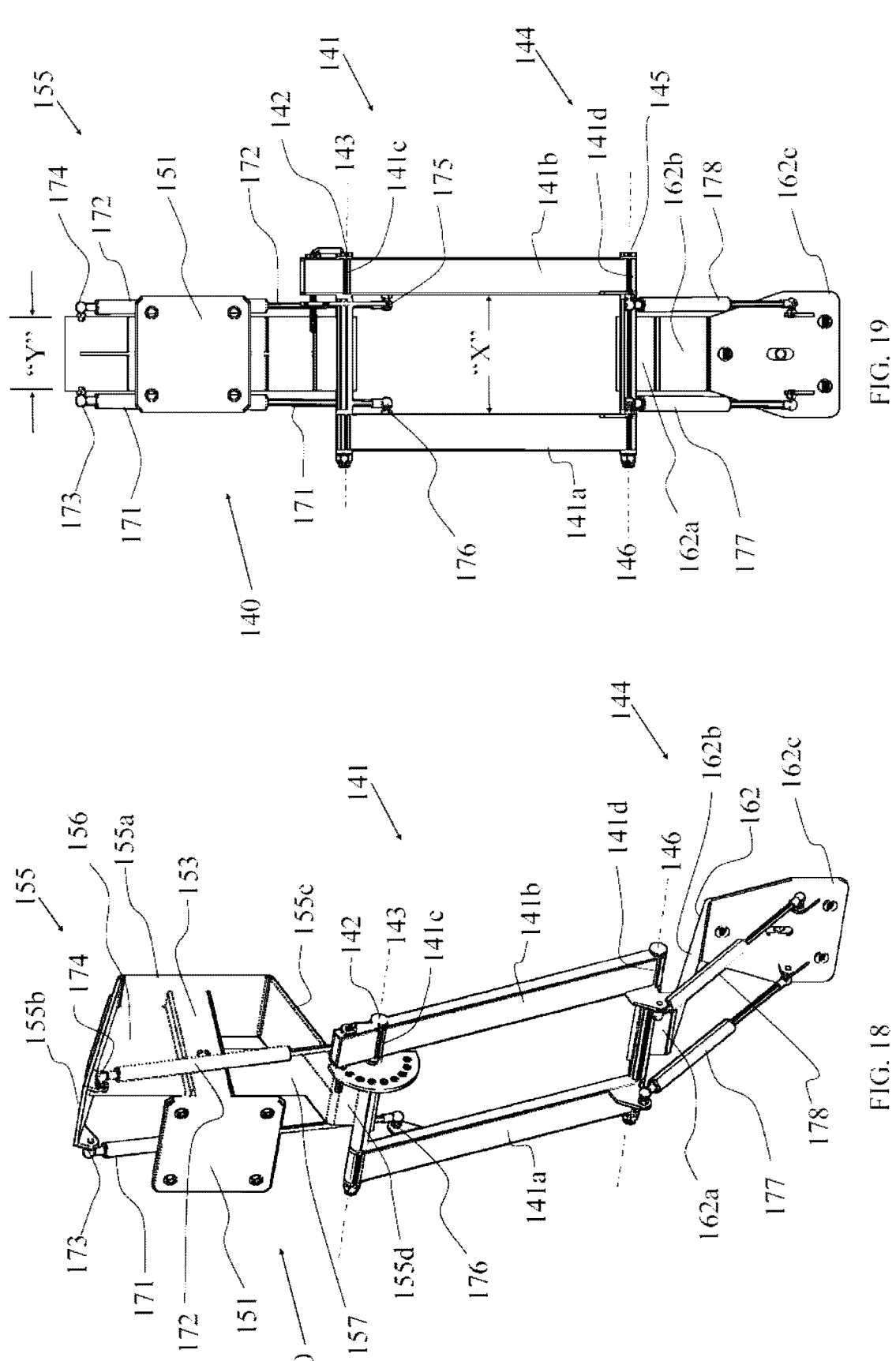
FIG. 18 is a pictorial representation of the wheel carrier of FIG. 4 from the front on the other side in the fully lowered position.
FIG. 19 is a front elevation of the wheel carrier of FIG. 4 in the fully lowered position.
Figure 21:
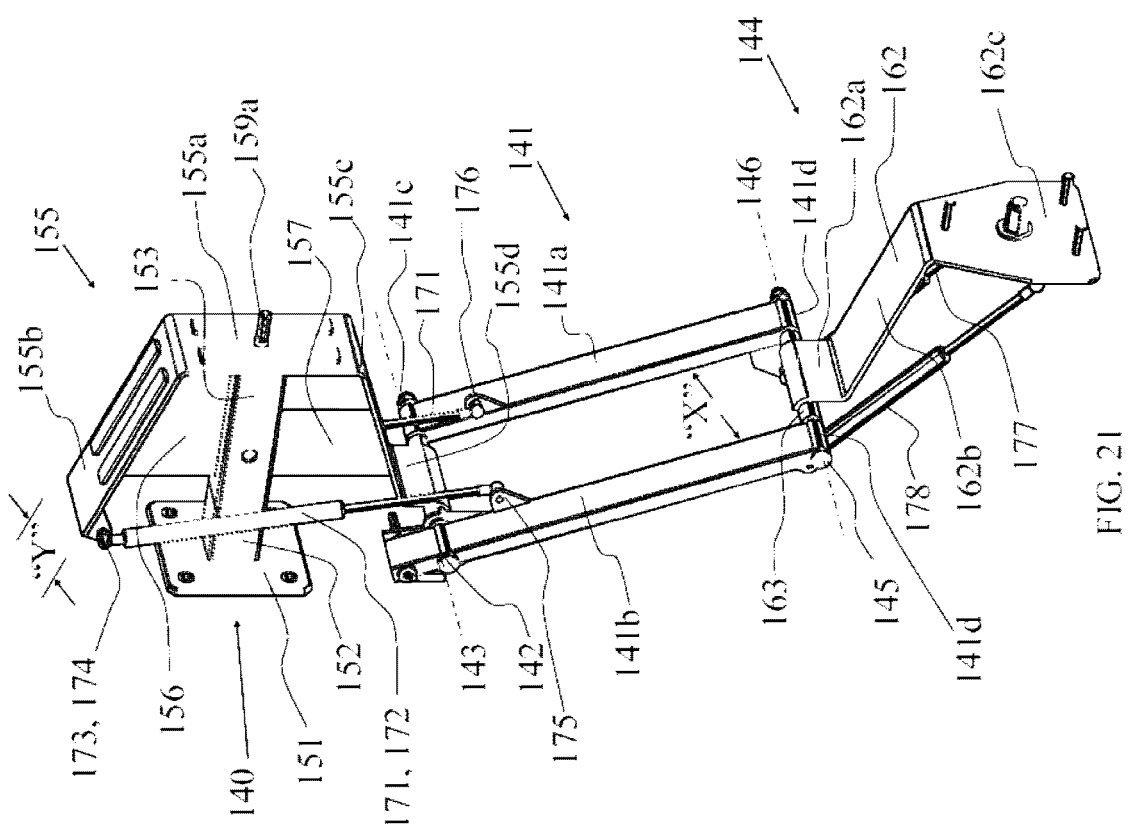
FIG. 21 is a pictorial representation of the wheel carrier of FIG. 4 from the rear on one side in the fully lowered position as shown in FIG. 20.
Figure 20:
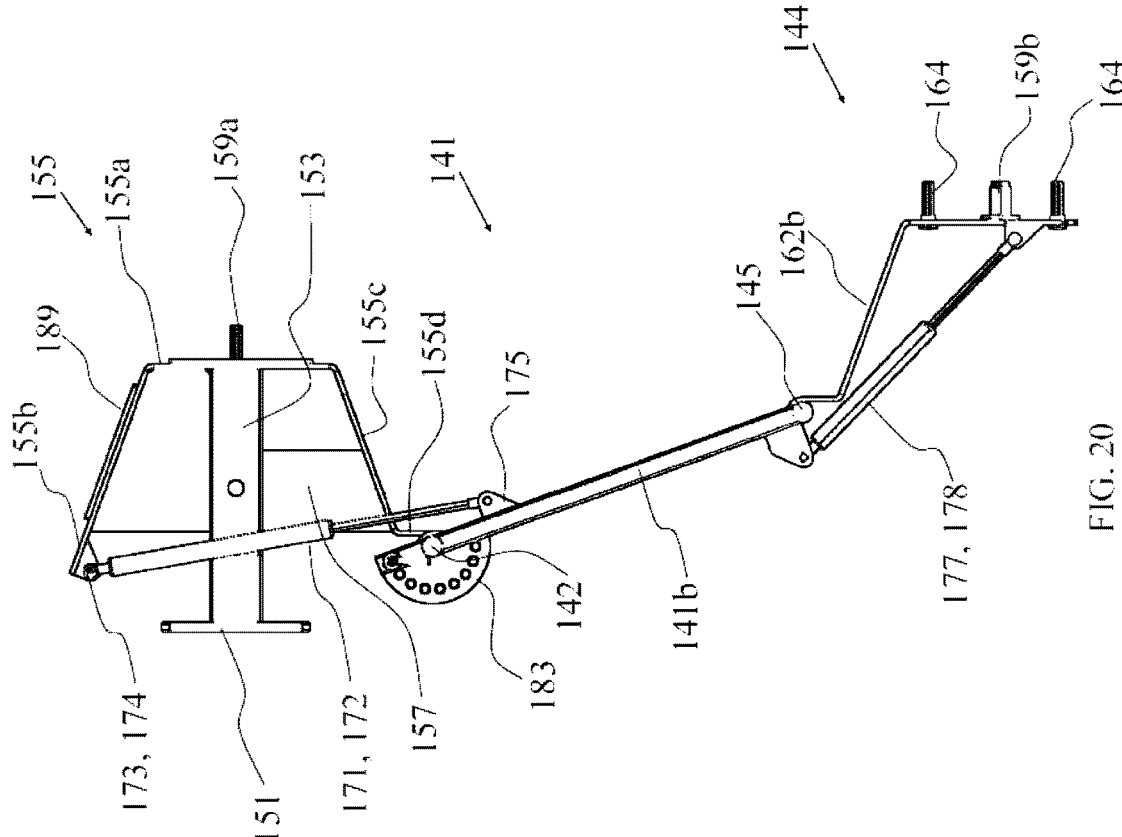
FIG. 20 is another side elevation of the wheel carrier of FIG. 4 in the fully lowered position.
Figures 22, 23:
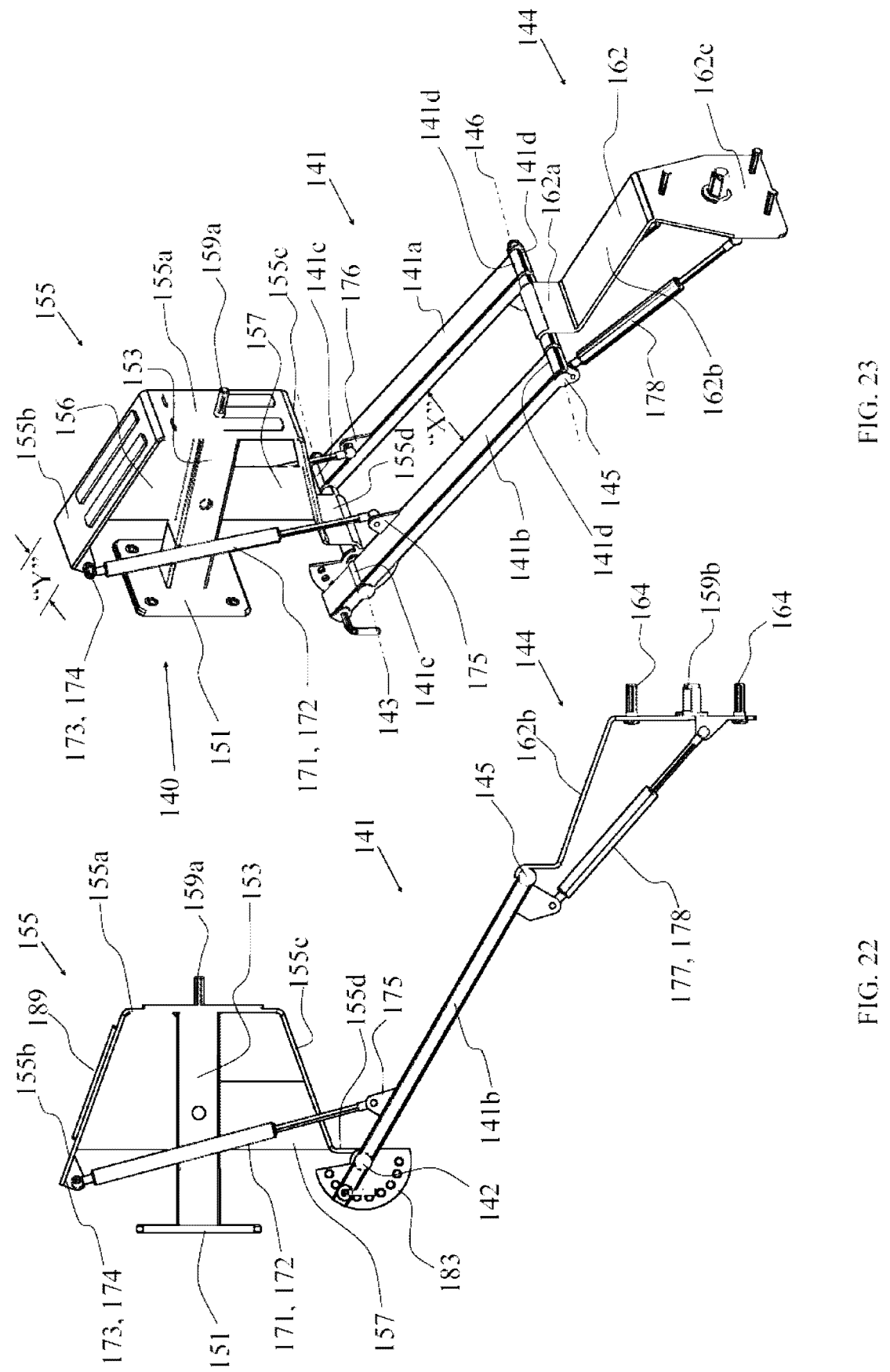
FIG. 22 is another side elevation of the wheel carrier of FIG. 4 in a partly raised/almost fully lowered position from the same side.
FIG. 23 is a pictorial representation of the wheel carrier of FIG. 4 from the rear on one side in the partly raised/almost fully lowered position as shown in FIG. 22.
Figures 24, 25:
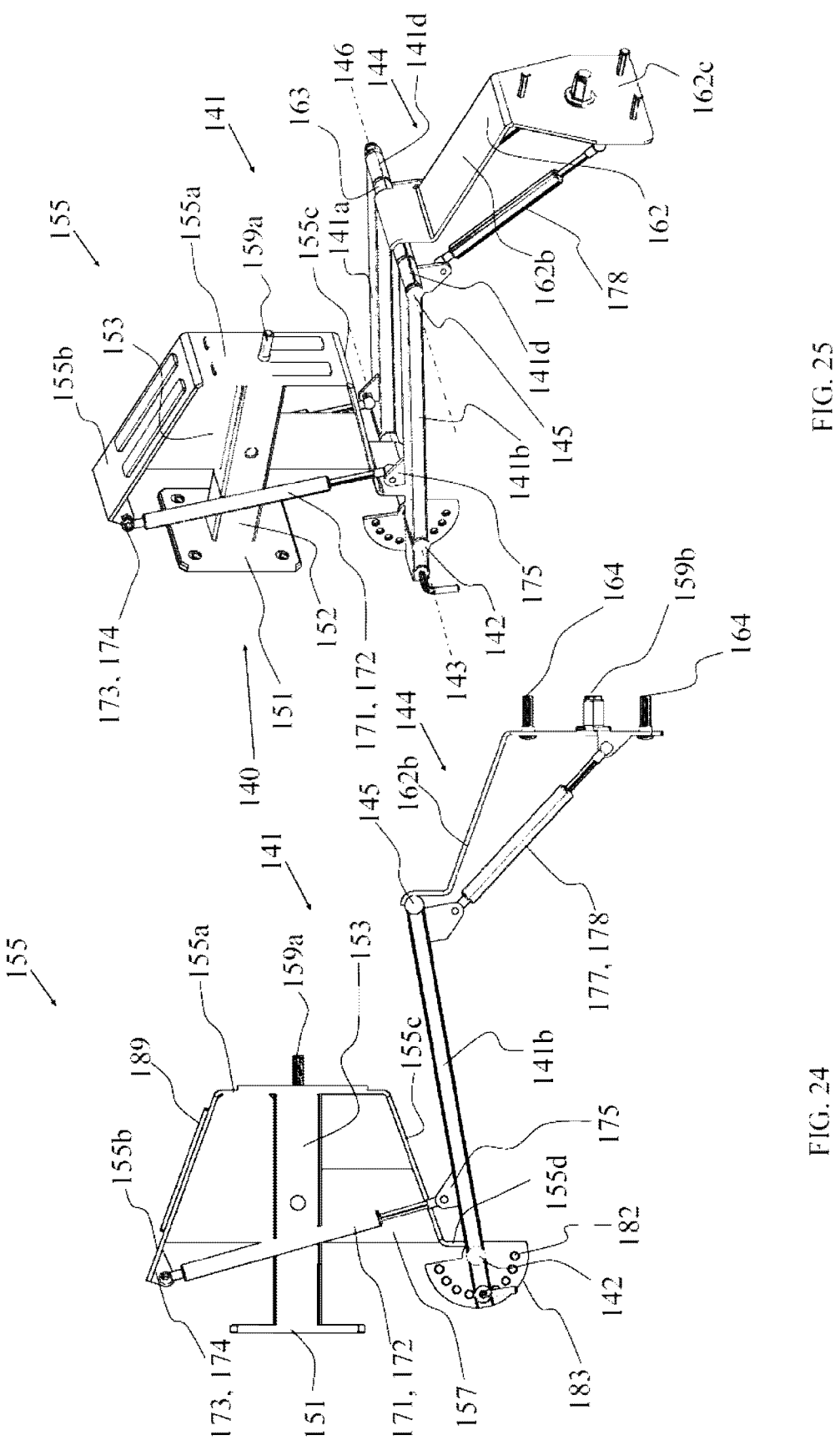
FIG. 24 is another side elevation of the wheel carrier of FIG. 4 in a "half" raised/"half" lowered position.
FIG. 25 is a pictorial representation of the wheel carrier of FIG. 4 from the rear on one side in the half raised/half lowered position as shown in FIG. 24.
Figures 26, 27:
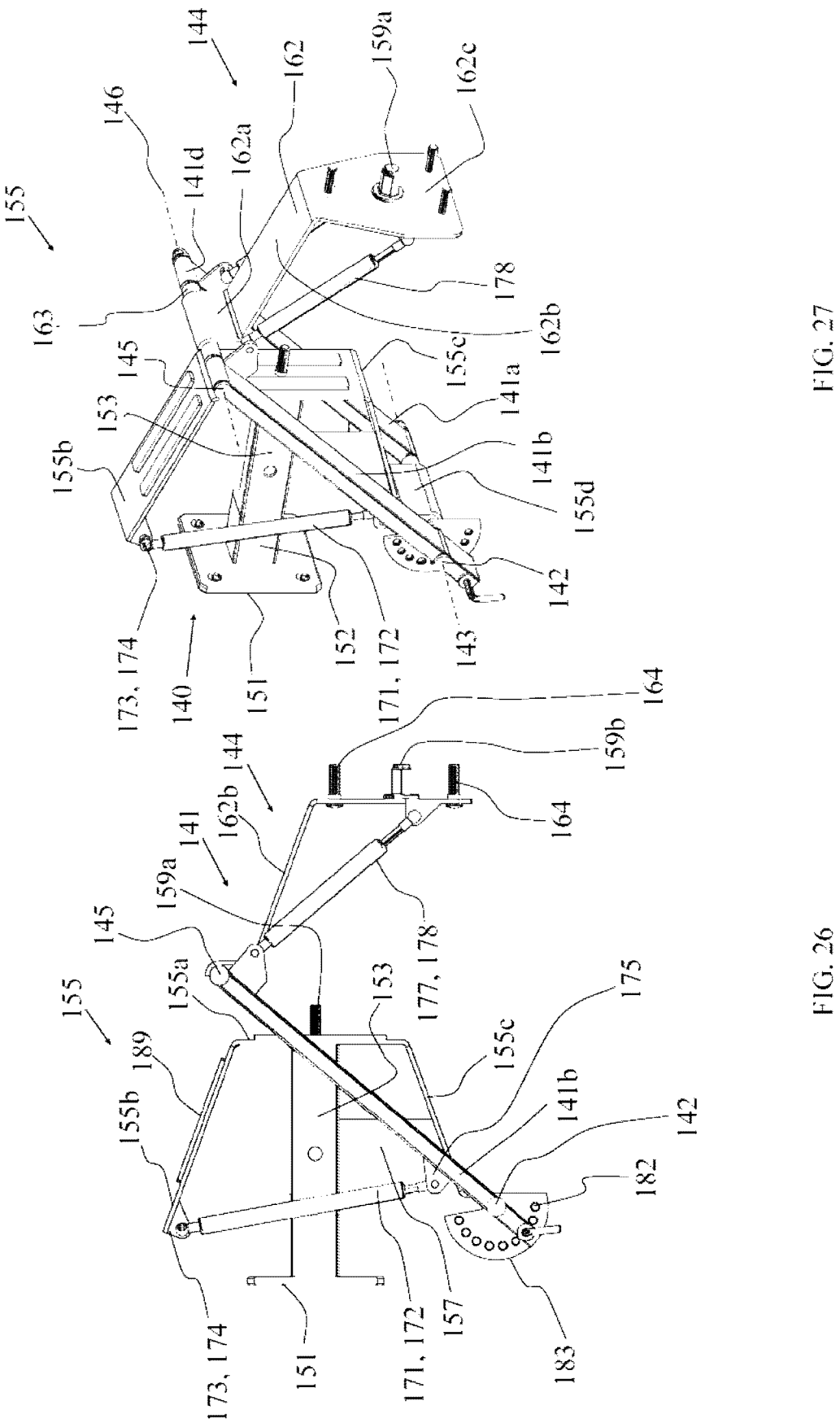
FIG. 26 is another side elevation of the wheel carrier of FIG. 4 in an almost fully raised/partly lowered position.
FIG. 27 is a pictorial representation of the wheel carrier of FIG. 4 from the rear on one side in the almost fully raised/partly lowered position as shown in FIG. 26.
Figure 29:
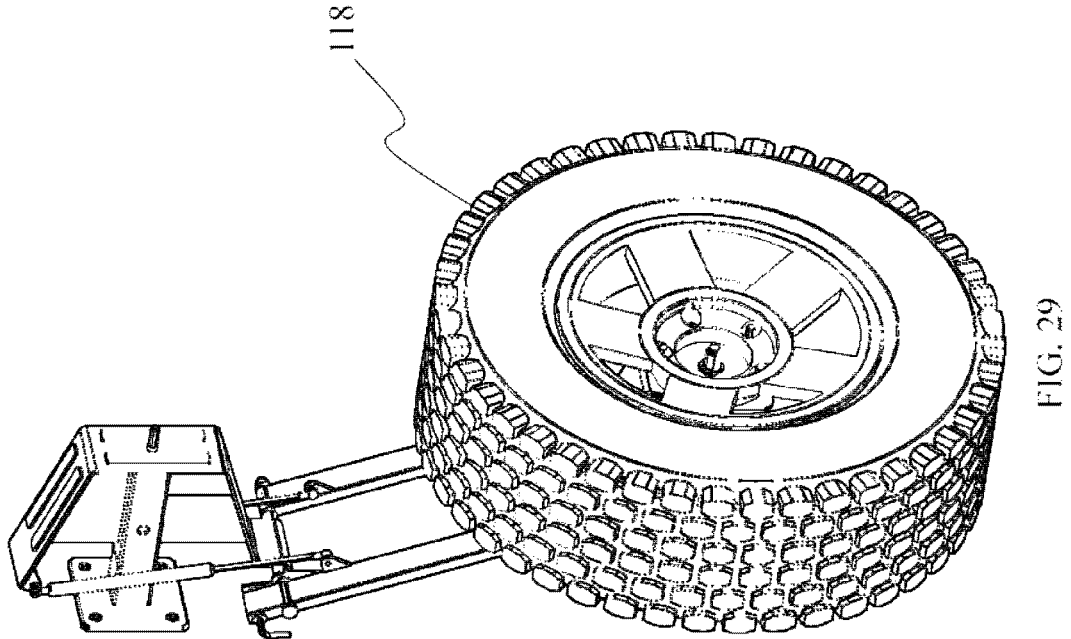
FIGS. 28 to 30 show the wheel carrier with a wheel mounted thereto and in the fully lowered position with the wheel resting on the ground.
Figure 28:
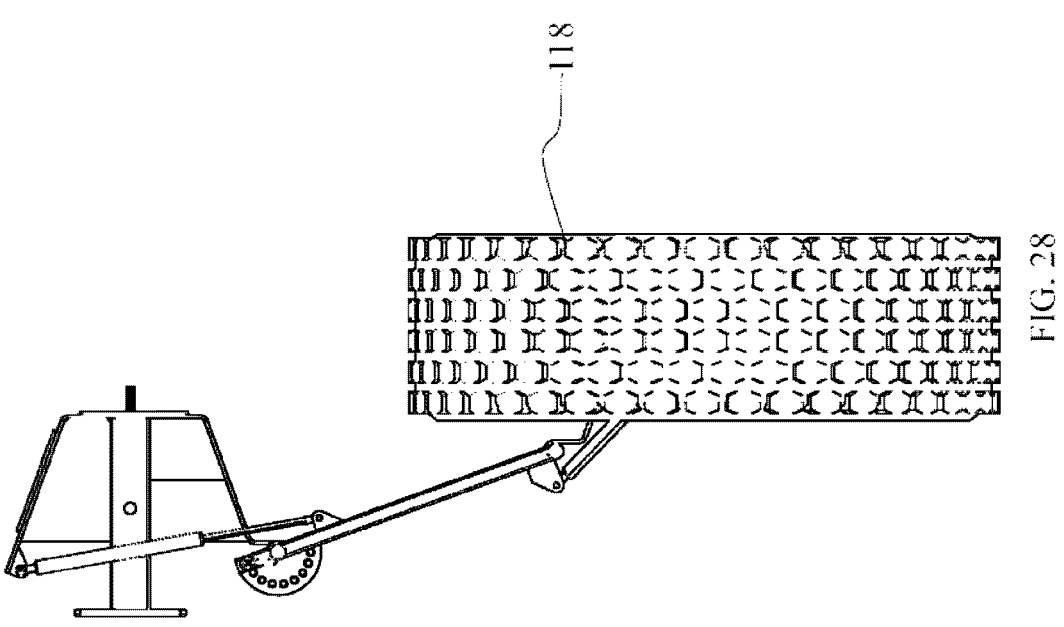
Figure 30:
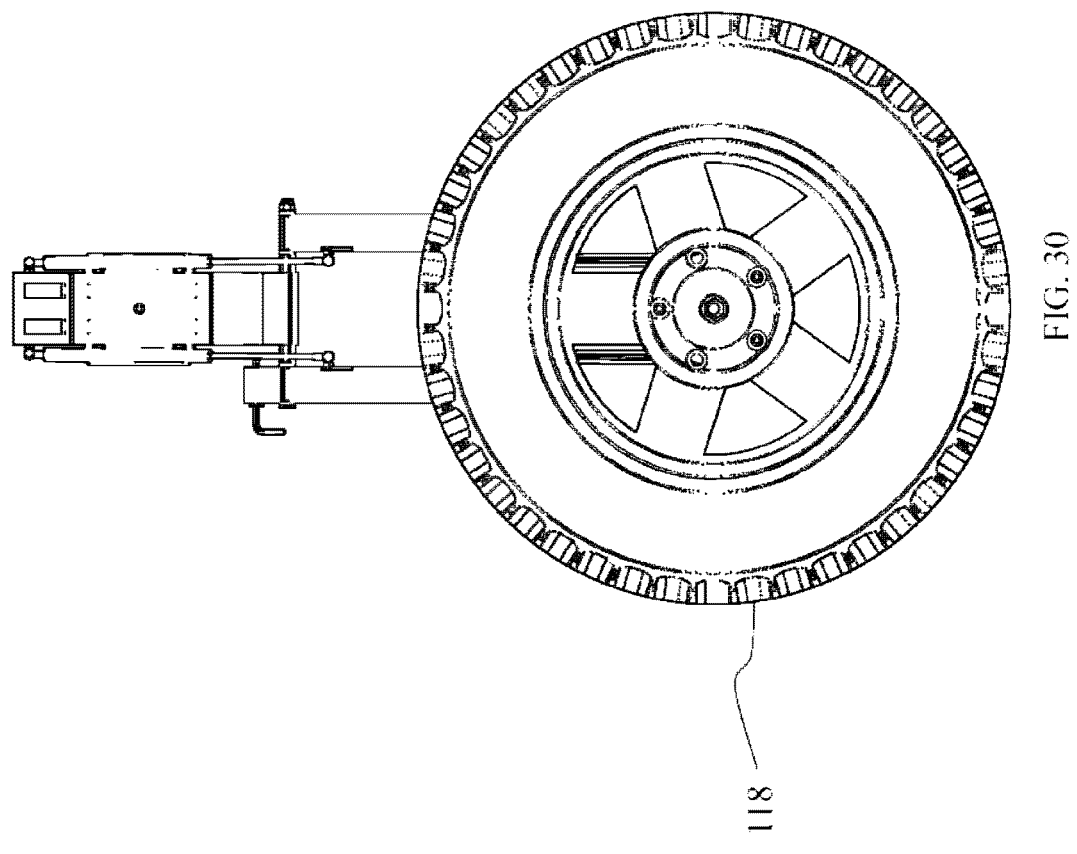

As can be seen more clearly in FIG. 12, the first component 140 includes a bracket or plate 151 which is adapted to mount to a swivel post on a rear protection bar. A short sleeve 152 formed of 75 mm×75 mm RHS protrudes rearward from plate 151 and a spacer bar 153 formed from 65×65 RHS is slidably engaged within the short sleeve and secured therein by a horizontal pin of known type (not shown).

A support panel 155 of generally truncated V-shape form in side view with a vertical end portion 155a welded to the outer end of spacer bar 153 and upper and lower inclined portions 155b and 155c which extend from the vertical end portion towards the vehicle and are reinforced by upper and lower gussets 156 and 157 which extend to the upper and lower faces of the and a welded thereto so as to hold upper inclined portion 155b and lower inclined portion 155c of the V-shaped panel in constant relationship with the 147 for a purpose which will be described later. Additionally, a locking bolt 159 extends rearward from the spacer bar 153 passing through the vertical end portion of the V shaped panel for a purpose which will be described later also. A hanger portion 155d is contiguous with lower inclined portion 155c to which a sleeve 158 is welded and arranged to receive therethrough pivot shaft 142.

The second component 141 comprises two spaced apart parallel frame members 141a and 141b with their outer faces lying in the same plane and having sleeves or sleeve portions 141c and 141d at their opposite ends through which respective pivot shafts 142 and 145 extend. Advantageously the width of the space "X" between the frame members is slightly greater than the width "Y" of the V shaped panel of the first component which allows the second component to swing over the V-shaped panel about pivot shaft 142 with the frame members on opposite sides thereof in a substantially vertical orientation above pivot shaft 142.

The third component 144 includes a generally Z-shaped panel 162 comprising a spacer portion 162a which is welded to a sleeve 163 through which pivot shaft 145 extends, a load bearing portion 162b contiguous with spacer portion 162a and a spare wheel connector portion 162c which is contiguous with load bearing portion 162b. Wheel studs 164 are mounted in the spare wheel connector portion 162c in no one manner.

A pair of gas struts 171 and 172 are connected at one end to opposite sides of the upper inclined portion 155b of the V-shaped panel 155 via opposed lugs 173 and 174 and at the other end to side frame members 141a and 141b via opposed lugs 175 and 176 spaced from the pivot shaft 143 to bias the second component towards the stowed position.

Similarly, gas struts 177 and 178 are connected at one end to the other ends of the side frame members 141a and 141b and to the spare wheel connector portion 162b at the other end to bias the third component to the stowed position. Advantageously, gas struts 177 and 178 are also effective to hold the spare wheel connector portion 162b in the vertical orientation so as to keep the spare wheel 118 vertical when it is resting on the ground ready to be removed and likewise for the damaged wheel to be fitted to the spare wheel connector portion.

As can be seen in various drawings, an adjustment mechanism is provided to lock the second component in a predetermined position relative to the first component by way of locking pin 181 engaging with any selected one of a plurality of apertures 182 provided in adjustment plate 183 which itself is welded to the hanger portion 155d of the first component in a fixed position. The adjustment mechanism allows the lowermost position of the second component to be selected for a particular wheel size whereby the wheel may rest on the ground in the vertical orientation when the second component is in the fully lowered position. If desired, a similar mechanism may be incorporated for example by way of a ratchet mechanism so that a person may lift a spare tire to a predetermined position where it is held so that a person may change grip on the tire 118 in order to obtain a better purchase to take it fully into the stowed position.

Figure 32:
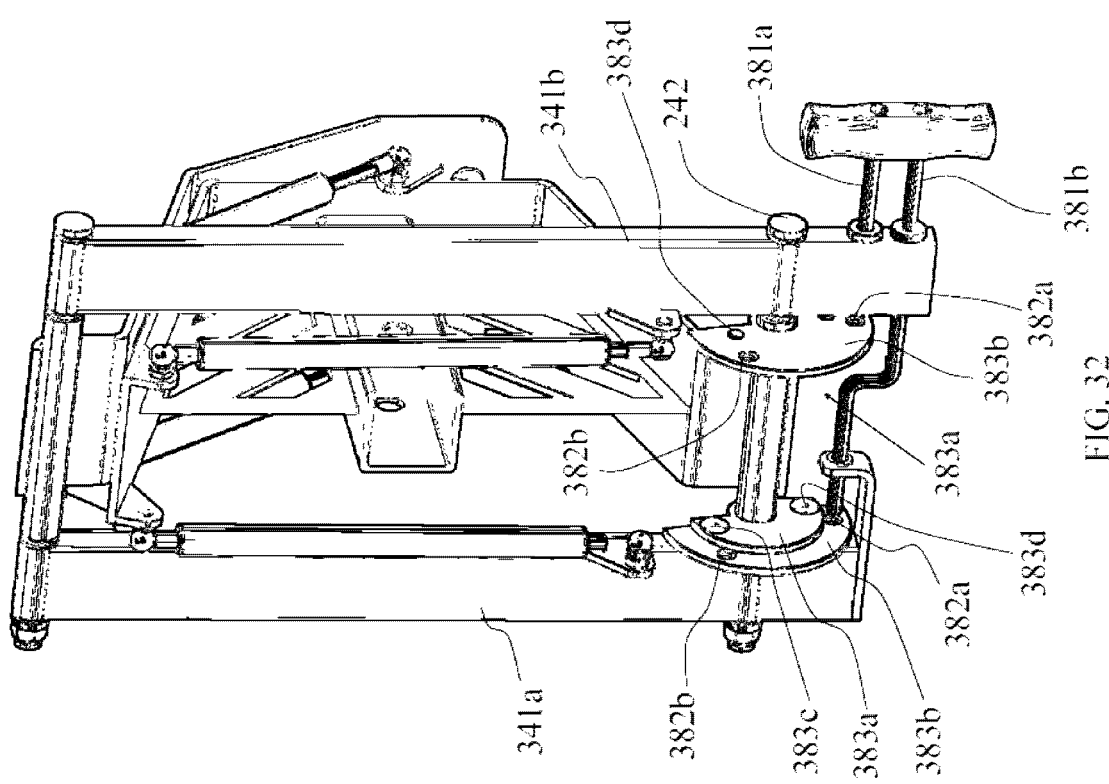
FIGS. 31 to 33 show another wheel carrier according to the invention with a different adjustment system.
Figure 31:
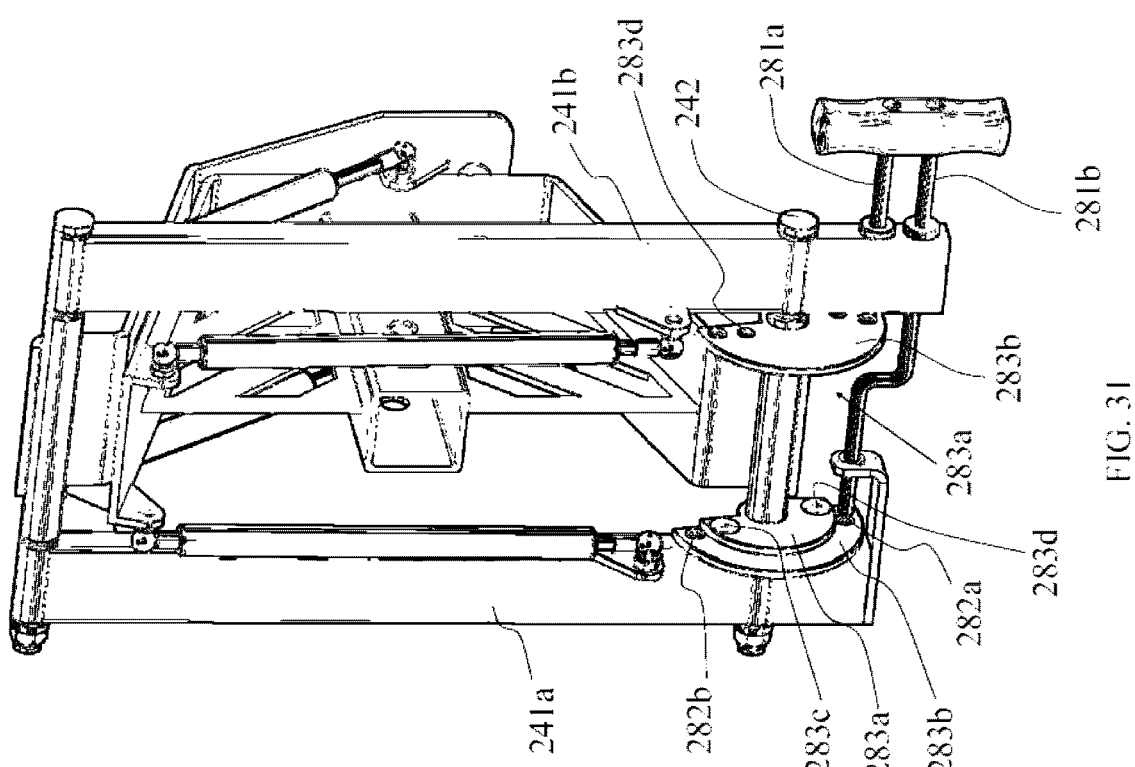
Figure 33:
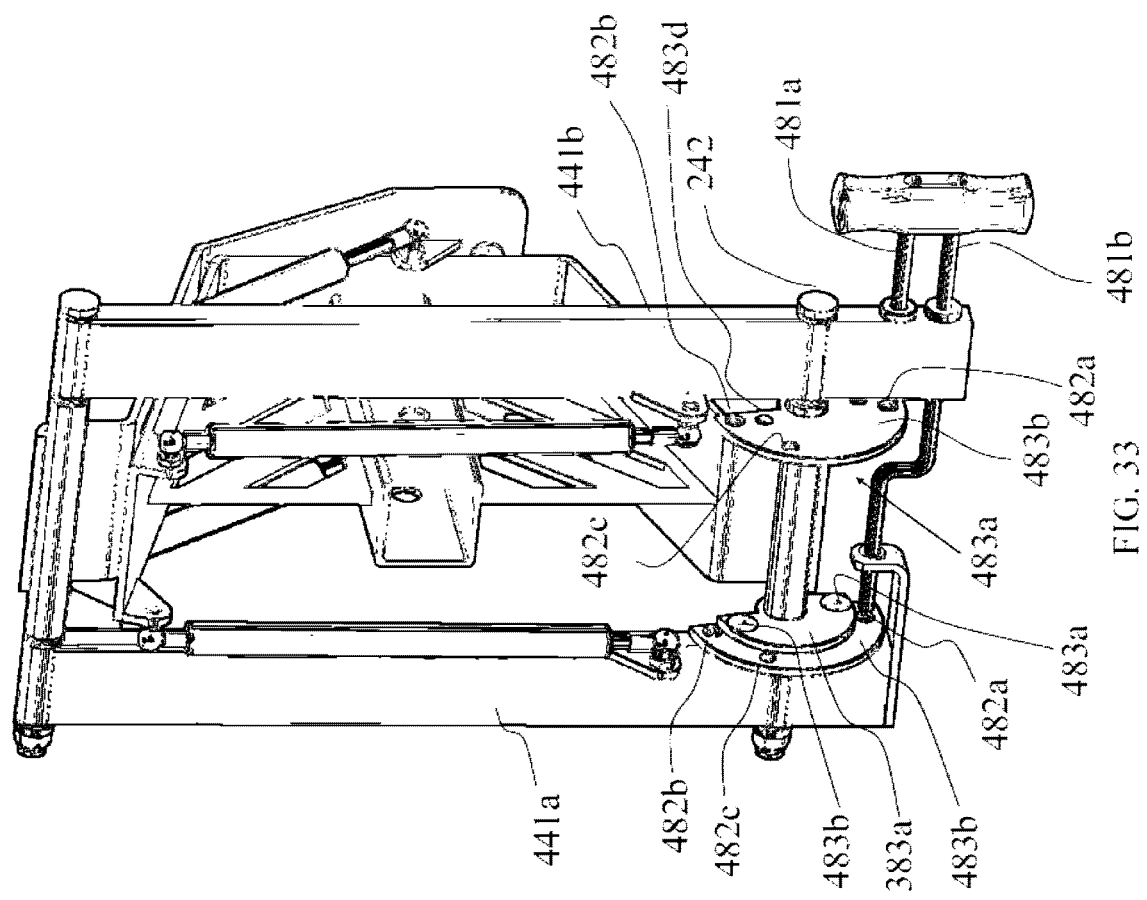

An alternative adjustment mechanism is shown in the wheel carrier 210 illustrated in part in FIGS. 31 to 33. As can be seen in FIG. 31, the adjustment mechanism comprises two spaced apart pairs of abutting plates mounted on pivot shaft 242, with the two plates of each pair secured together by set bolts 283c and 283d. Advantageously, the outside plate 283b of each pair can be replaced by a different plate such as that shown in FIG. 32 where the angular distance between the fully raised locking position set by hole 282a and the fully lowered position set by hole 282b is changed to suit a different diameter wheel whereby the fully down position will be higher or lower to suit. Thus, a plate specific to a particular vehicle can be selected. In another alternative, a plate with a plurality of holes can be selected such as that illustrated in FIG. 33 where a third hole 482c is provided as well as hole 282b giving two choices of down positions. Of course, any number of holes may be provided as desired. As will also be appreciated from FIGS. 31 to 33, this particular form of adjustment holds arms 241a and 241b together and each arm is locked independently thereby preventing relative twisting therebetween. Suitably, this adjustment system incorporates two co-acting locking pins 281a and 281b, arranged to engage their respective locking plates.

Returning now to FIGS. 2 to 30, as can be seen more clearly in side elevation, for example in FIG. 5, load bearing portion 162b of the third component is arranged to rest on upper inclined portion 155b of the first component so as to transmit the weight of the spare wheel 118 largely thereto. In order to limit or prevent chafing between the two plates, rubber cushions 189 are glued or riveted to the upper inclined portion 155b. It will also be seen that the spare wheel connector portion 162C is secured to the spacer shaft 153 by vertical portion 155a of the V shaped panel by stud 159a and complementary nut 159b. Thus, it will be appreciated that the wheel carrier mounts the spare wheel close to the back panel of the vehicle with the rim of the spare wheel partially surrounding the V shaped panel and in the stowed position the second component is effectively free of load and the weight of the spare wheel is transmitted almost directly to the first component and from there directly to the rear protection bar.

In use, the wheel carrier would normally be mounted to a vehicle as shown in the drawings and when the spare wheel 118 is needed, it may be deployed by unlocking the third component from the first component, and then pulling the wheel and wheel mount out and down to rest on the ground for detachment of the wheel from the wheel mount.

Although the invention has been described with reference mainly to one specific example, it will be appreciated by those skilled in the art that the invention may be embodied in many other forms and fall within the broad scope and ambit of the invention as herein set forth.

The invention claimed is:

1. A wheel carrier for a vehicle, including:
a first component adapted to be secured on or to a vehicle, said first component including load support means for supporting a load thereon, said load support means including a plate having an upper face;
a second component operatively connected to said first component for movement relative thereto about a generally horizontal first pivot axis from a stowed or upper position to an extended or lowered position; and
a third component operatively connected to said second component for movement relative thereto about a generally horizontal second pivot axis from a stowed or upper position to an extended or lowered position, said third component including load transfer means and mounting means for mounting a spare wheel to said load transfer means, said load transfer means including a plate having a lower face, said lower face being adapted to engage with the upper face of the plate of the load support means of the first component;
said second pivot axis being spaced from said first pivot axis and higher than said first pivot axis when said second component is in its stowed or upper position on a vehicle and said second pivot axis being lower than said first pivot axis when said second component is in its extended or lowered position; and
securing means for securing said third component in the stowed or upper position, wherein said securing means is arranged to secure said third component to said first component in a manner whereby said load transfer means is substantially juxtaposed with said load support means of said first component such that the weight of the spare wheel is transferred directly to said load support means by engagement of the lower face of the plate of said load transfer means with the upper face of said load support means when the second component is in the stowed position.

2. A wheel carrier according to claim 1 wherein the components are so made and arranged that the spare wheel is held in a substantially vertical orientation when in the stowed position.

3. A wheel carrier according to claim 1 including adjustment means adapted to allow the height to be adjusted at any time so that the spare wheel may be lowered to an optimum position to suit the terrain where a wheel may have to be replaced.

4. A wheel carrier according to claim 1 wherein said first component includes first securing means for securing the wheel carrier to the vehicle and second securing means for securing the third component to the first component.

5. A wheel carrier according to claim 4 wherein the first and second securing means cooperate to the extent that the wheel weight load on the spare wheel mounting means of the third component is substantially transferred to the first component.

6. A wheel carrier according to claim 4 wherein the first component is arranged so as to hold the hub of the spare wheel in a predetermined position spaced from said first securing means.

7. A wheel carrier according to claim 6 wherein the spare wheel mounting means of the third component includes a metal plate of a size and shape allowing at least three diagonally opposite wheel studs to secure the spare wheel thereto and the first component includes a complementary plate of a sufficient size to provide for face to face engagement of the two plates.

8. A wheel carrier according to claim 1 wherein the second component comprises a frame having two spaced apart side members which together straddle at least a portion of the first component.

9. A wheel carrier according to claim 8 wherein the second component stands close to the vehicle while the first component extends through the second component.

10. A wheel carrier according to claim 8 wherein the third component rests against a portion of the first component extending through the second component.

11. A wheel carrier according to claim 10 wherein the weight of the spare wheel is substantially transferred directly to the first component when in the stowed position.

12. A wheel carrier according to claim 1 including biasing means arranged to bias the second component towards the stowed or upper position.

13. A wheel carrier according to claim 12 including two spaced apart gas struts mounted in parallel.

14. A wheel carrier according to claim 1 including biasing means arranged to bias the third component towards the stowed or upper position.

15. A bumper bar for a vehicle, including:
a first member adapted to extend substantially across the width of the vehicle, the first member including connecting means for connecting it to the chassis of the vehicle, one or two spare wheel carriers according to claim 1, and mounting means for mounting the one or two spare wheel carriers.

16. A wheel carrier including:
a fixed mounting component adapted to be securely mounted to a vehicle, said fixed mounting component including a plate with an upper face adapted to receive thereon the weight of a spare wheel;
a first pivotable component pivotally mounted at a proximal end to the fixed mounting component and having a distal end remote from the proximal end, and arranged to allow pivoting of the first pivotable component from a stowed position alongside the vehicle to a deployed position away from the vehicle; and
a second pivotable component pivotally mounted to the distal end of the first pivotable component and including a mounting for releasably mounting a spare wheel thereto, the second pivotal component being adapted to pivot from a position alongside or adjacent the first pivotable component in the stowed position to a position away from and below the first pivotable component in the deployed position; and wherein said second pivotal component includes a plate with a lower face arranged to directly transfer the weight of the spare wheel mounted thereto to the fixed mounting component.

\*    \*    \*    \*    \*